United States Patent [19]
Nitta et al.

[11] Patent Number: 5,757,360
[45] Date of Patent: May 26, 1998

[54] HAND HELD COMPUTER CONTROL DEVICE

[75] Inventors: Tohei Nitta, Newton; Darrin B. Jewell, Somerville; Marilyn A. Walker, Boston, all of Mass.

[73] Assignee: Mitsubishi Electric Information Technology Center America, Inc., Cambridge, Mass.

[21] Appl. No.: 433,618

[22] Filed: May 3, 1995

[51] Int. Cl.⁶ .................................................. G09G 5/00
[52] U.S. Cl. .......................... 345/156; 345/157; 345/158
[58] Field of Search ............................. 345/156, 157, 345/158, 161, 163, 122

[56] References Cited

U.S. PATENT DOCUMENTS

| | | | |
|---|---|---|---|
| 4,567,610 | 1/1986 | McConnell | 382/18 |
| 4,839,838 | 6/1989 | LaBiche et al. | 345/163 |
| 4,925,189 | 5/1990 | Braeunig | 345/157 |
| 5,184,319 | 2/1993 | Kramer | 364/806 |
| 5,453,758 | 9/1995 | Sato | 345/156 |
| 5,481,278 | 1/1996 | Shigematsu et al. | 345/156 |

FOREIGN PATENT DOCUMENTS

WO 92/09983  6/1992  WIPO ..................... 345/157

*Primary Examiner*—Mark R. Powell
*Assistant Examiner*—Matthew Luu
*Attorney, Agent, or Firm*—Robert K. Tendler

[57] ABSTRACT

A compact convenient hand-held, accelerometer-based computer control device is utilized to control on-screen animated characters presented by a computer-driven display in which the movement, persona, or style of the character is controlled through movement of the device in a predetermined pattern which results in recognizable patterns of accelerations that are detected to give the on-screen character a particular persona or style determined by the user. Thus, the system requires only a series of easily learned hand movement patterns for corresponding character control. In an alternative embodiment, once a movement has been determined, the style or emotional content of the movement is specified directly from gross accelerometer output without pattern matching. In another embodiment, the outputs of two or more accelerometers are combined, with the combined waveforms constituting a language for graphical object control. In a still further embodiment, one or more patterns are detected serially as a language to direct the appropriate movement or persona for the character or icon presented on-screen. In yet another embodiment, accelerations are normalized to the local gravitational field such that the orientation of the control device is irrelevant. In an additional embodiment, since the location of the on-screen character is known, the character may be given incremental motions from this location by moving the device in the direction of the intended incremental motion, thus to direct the motion of the character in the same direction as the hand movement.

11 Claims, 12 Drawing Sheets

DECREASE SPEED
[DOWN]

RESET
[SQUARE]

INCREASE SPEED
[UP]

RIGHT TURN
[RIGHT]

LEFT TURN
[LEFT]

BOUNCE TOGGLE
(UP SHAKE 4)

WOBBLE TOGGLE
[SIDE SHAKE 4]

FLIP
[CIRCLE]

FIGURE EIGHT
[FIGURE 8]

STATION KEEP
[SWAY]

HAND HELD COMPUTER CONTROL DEVICE

FIELD OF THE INVENTION

This invention relates to computer control and more particularly to a hand-held device for controlling movement and persona of an on-screen graphical object, icon, or character without providing frictional contact or mechanical coupling of the device with a fixed surface or structural element.

BACKGROUND OF THE INVENTION

As described in U.S. Pat. No. 5,347,306, issued to Tohei Nitta on Sep. 13, 1994, and incorporated herein by reference, an electronic meeting place can be provided in which conferees or participants can meet through control of on-screen characters, the movements of which are under control of the individuals. The system described in this patent utilizes cartoon characters or icons in order to avoid the problems with full-frame video teleconferencing. However, in the portrayal of one's self in terms of an on-screen character, it is necessary to provide this character with a persona, style, or mood specified by the individual participant. As described in this patent, the persona is controlled by switches on a keyboard or in a separate box so that full control can be provided over the representation of the individual participant.

It will be appreciated that the utilization of separate switches and key strokes is a cumbersome way to control the persona of the on-screen character. While it might be possible to use the traditional computer mouse to in some way control character persona or style, such a system is not easy to use and requires the individual to be at the computer terminal. It would not be possible when using the computer mouse to sit back in one's chair or move around during teleconferencing. There is therefore a need for a more practical and simpler way to control the on-screen characters.

More particularly, as is well known, a mouse is utilized to control cursors represented on a computer screen in which the position of the cursor is controlled through the frictional contact of the mouse's roller balls with a fixed surface, usually in the form of a so-called mouse pad. While the utilization of a mouse for computer control is indeed an efficient method for control of computer operations, the mouse has not been utilized to control the persona or style of icons or on-screen characters but rather has been used to move on-screen objects by clicking on them and dragging them to different locations, with the length of the move proportional to the movement of the mouse over the mouse pad. The traditional mouse is therefore incapable of controlling the persona of a cartoon or other character which is presented on-screen in a conferencing or meeting scenario to represent the individual communicating with others in an electronic meeting place or other environment.

Specifically, in order to get a graphical object on a screen to move in a given direction with a mouse, one must click on the object and then move the mouse to drag it by specifying each location along the desired path. Thus a graphical object cannot be made to move in a desired direction without specifying each point along the way. As a result, simple movements of the graphical object cannot be made by merely directing the graphical object to go in a desired direction. Thus the mouse is inefficient both to specify simple movements and to give a graphical object a desired persona.

By way of further background, as indicated in the above-mentioned patent, the movement of the individual characters representing a particular person can be controlled through data gloves, data suits, chair input devices and the like. These devices are in some sense cumbersome, and it is therefore desirable to provide a convenient and preferably hand-held device which controls not only the movement of one's individual character, but also the mood or the persona which the individual wishes to impart to his on-screen character.

As mentioned above, in this patent cartoon characters are prestored to dramatically reduce the bandwidth required for teleconferencing. During the teleconferencing scenario, the individuals participating in a conference need to be able to control how they are presented to the conferees. This is accomplished through the provision of the associated persona commands, in one embodiment by providing physical switches at each of the terminals for each of the participants in a distributed teleconferencing network.

However, the utilization of individual switches, or even a mouse driving a cursor on a screen menu is a cumbersome way in which to control what other conferees see of the individual conferee. There is therefore a requirement for a hand-held device which can be free of contact with a table or other flat surface that can be conveniently waved around by an individual conferee to permit control of his character without the requirement of wearing a data suit or a data glove, without the requirement of detecting hand or body position through optical recognition techniques which are computer intense and slow, and without any physical attachment to a fixed structure to sense hand or finger position.

Again, by way of background, hand gestures have been utilized in communication systems for the deaf. U.S. Pat. No. 5,047,952 describes an instrumented glove to produce signals corresponding to hand configuration utilizing strain sensors. A system for converting an image to an animated cartoon-like drawing through a so-called contour extractor is illustrated in U.S. Pat. No. 4,546,383. U.S. Pat. No. 4,884,972 utilizes a mouse to select words for animated characters, whereas U.S. Pat. No. 4,906,940 describes a system for extracting features and images for machine control. Moreover, U.S. Pat. No. 5,008,946 describes a system sensing the movement of one's pupil and one's mouth to control a car, whereas U.S. Pat. 4,414,537 shows a man-machine interface utilizing a data glove. U.S. Pat. No. 4,567,610 illustrates a reference histogram for pattern recognition, whereas the following articles and thesis describe hand gesture recognition systems and adaptive interfaces relating to hand gestures:

Tomoichi Takahashi and Fumio Kishino, Hand Gesture Coding Based on Experiments Using a Hand Gesture Interface Device, SIGCHI Bulletin, April 1991; Interpreting Sign Language, IEEE Computer Graphics & Applications, January 1994, pps. 36–37; Jennifer A. Hall, The Human Interface in Three-Dimensional Computer Art Space, Media Lab, Massachusetts Institute of Technology, MSVS Thesis, Oct. 18, 1985; and, S. Sidney Fels, Building Adaptive Interfaces with Neural Networks: The Glove-Talk Pilot Study, Department of Computer Science, University of Toronto, Tech Report No. CRG-TR-90-1, February 1990.

It will be seen that while there are various methods of hand gesture recognition, they rely on multiple hand gestures for computer control. As such, signing recognition is much too complicated for machine control, as the difference in the various hand signs are difficult to recognize, and the language associated with hand signing too complex for machine control.

Note that in terms of arcade games, joy sticks, and the like control graphical objects through the use of strain gages and switches, with the strain being measured between a fixed structure and the joy stick. These are simple systems which do not analyze strain gage waveforms nor combine waveforms for graphical object control. Thus there are no comparisons or correlations with templates that can be used to establish the existence of a given gesture or series of gestures. As a result television game control devices generally do not provide a sufficient level of sophistication to control the persona of graphical objects representing human beings.

SUMMARY OF THE INVENTION

What is provided in one embodiment for the control of graphical objects is a hand-held device which is moved or waved around by the individual in a series of easily learned patterns, with each pattern or series of patterns resulting in the desired control of the on-screen character. In one embodiment, an egg-shaped device is provided with internal orthogonally-oriented accelerometers, with the sensed accelerations being converted via an analog-to-digital converter to signals which are transmitted to the computer. The accelerations provided by different hand gestures or movements are identifiable through the utilization of templates which provide histograms of the patterns to be recognized. Correlation of raw data to the templates provides for the generation of control signals for generating the control of the appropriate on-screen graphical object. In such embodiments the system includes a training session in which an individual trains the system for the particular patterns he desires for the control of the graphical object in question. After the training session, the accelerations are utilized to control the on-screen graphical object so as to either move the graphical object or provide it with actions depicting a particular persona or mood which the individual wishes to impart to his character.

In one embodiment, a character can be made to execute a simple motion to track the motion of the control device. Since the character is already located at a point on the screen, incremental on-screen movements in a given direction can be instigated through movement of the hand-held device in the desired direction, assuming the hand movement is recognized for the particular graphical object movement.

In another embodiment once a particular movement is selected for an on-screen icon or character, raw accelerometer outputs are used directly to control the intensity/style of this on-screen icon.

Because in one embodiment the hand-held device is in the form of an egg, the egg-shaped device has a natural orientation when grasped by the hand. This gives the user the perception or tactile feedback as to how to move the device to achieve, for instance, the desired direction of movement. As contrasted to a ball-shaped device or any device with point symmetry, the use of the egg gives the device a perceived up orientation to make it natural to specify other directions with hand movements.

In a preferred embodiment, the accelerations are normalized to the local gravitational field vector both to provide a stationary reference for the analysis of the accelerations regardless of the orientation of the device within the hand, and also to resolve any aliasing or 180 degree ambiguity, making device orientation irrelevant.

In a further embodiment, and to eliminate false activation of the graphical object control system, a button is placed on the device, in the egg embodiment at the top of the egg, which is actuatable by the thumb in order to start the acceleration detection process. Prior to thumb activation, all accelerations are ignored, whereas during the depression of the thumb switch, acceleration data is transmitted for decoding and graphical object control.

It will be appreciated that what is provided is a hand-held device which operates in free-air in an untethered state and requires no physical contact with a fixed structure for the provision of computer control information. As such the subject hand-held device is said to be non-contactual. Rather, the device fits easily within the hand, and in one embodiment is not umbilically tied to the computer, but rather communicates with the computer control system via wireless data transmission.

The convenience of such an ergonometrically designed computer control device makes it easy for the participants in an electronic meeting place type conference to control their associated characters. During a conference, for instance, an individual depicted by his/her character to be seated at a table may be made to rise from his/her seat and pace off, as if in anger; or may be made to appear either bored or agitated, completely at the discretion of the individual controlling the representation of himself/herself. Thus the movement of the character and the persona of the character can be easily controlled with a pleasing hand-held device in which the orientation of the device within one's hand is not critical to the ability to effectuate character control or graphical object control through a limited series of highly-defined hand gestures or movements.

As part of the subject invention, a series of gestures may be considered to be a language such that when the gestures are performed in a predetermined sequence, the correlation is made to a particular type of computer control. Thus while the system will be described in accordance with the control of graphical objects, computer control through a language of a series of sensed motions is within the scope of this invention.

In summary, an unconstrained, hand-held computer control device, in one embodiment accelerometer-based, is utilized to control graphical objects in a computer-driven display in which the movement and persona of the graphical object is controlled through movement and resulting accelerations of the hand-held device, such that computer control is effectuated without the requirement of a roller ball contacting a fixed surface to provide positional input. In one embodiment a series of easily learned hand movements or gestures provide for the corresponding graphical object control in which one or more hand gestures or movements are detected serially as a language to obtain the appropriate movement or persona of the graphical object presented on-screen. In order to make device movement recognition independent of device orientation, in a preferred embodiment accelerations in the X and Y directions are referenced to the local gravity vector, making it unnecessary to ascertain the orientation of the hand-manipulated device in order to provide highly recognizable hand movement and gesture recognition. In one embodiment, the device is egg-shaped to provide a preferential orientation of the device in the individual's hand, thereby to be able to specify a general up direction for the device. In another embodiment, a Z direction accelerometer increases the number of hand movements or gestures that can be recognized, with a button or switch at the top of the egg, in a further embodiment, providing an actuation signal for the start of the detection process, thus to eliminate false activations. In a preferred embodiment the control device is wireless for ease of use, whereas in another embodiment, the control device includes accelerometers and a processor mounted at the top of a wand, with electrical connections at the base of the wand being hard wired to the computer. Also, as part of the subject invention, any computer-driven graphical object may be controlled such that the hand-held device provides the requisite generalized computer control, with visual feedback being provided by the display.

BRIEF DESCRIPTION OF THE DRAWINGS

These and other features of the Subject Invention will be better understood in connection with the Detailed Description taken in conjunction with the Drawings of which.

DETAILED DESCRIPTION

Figure 1:
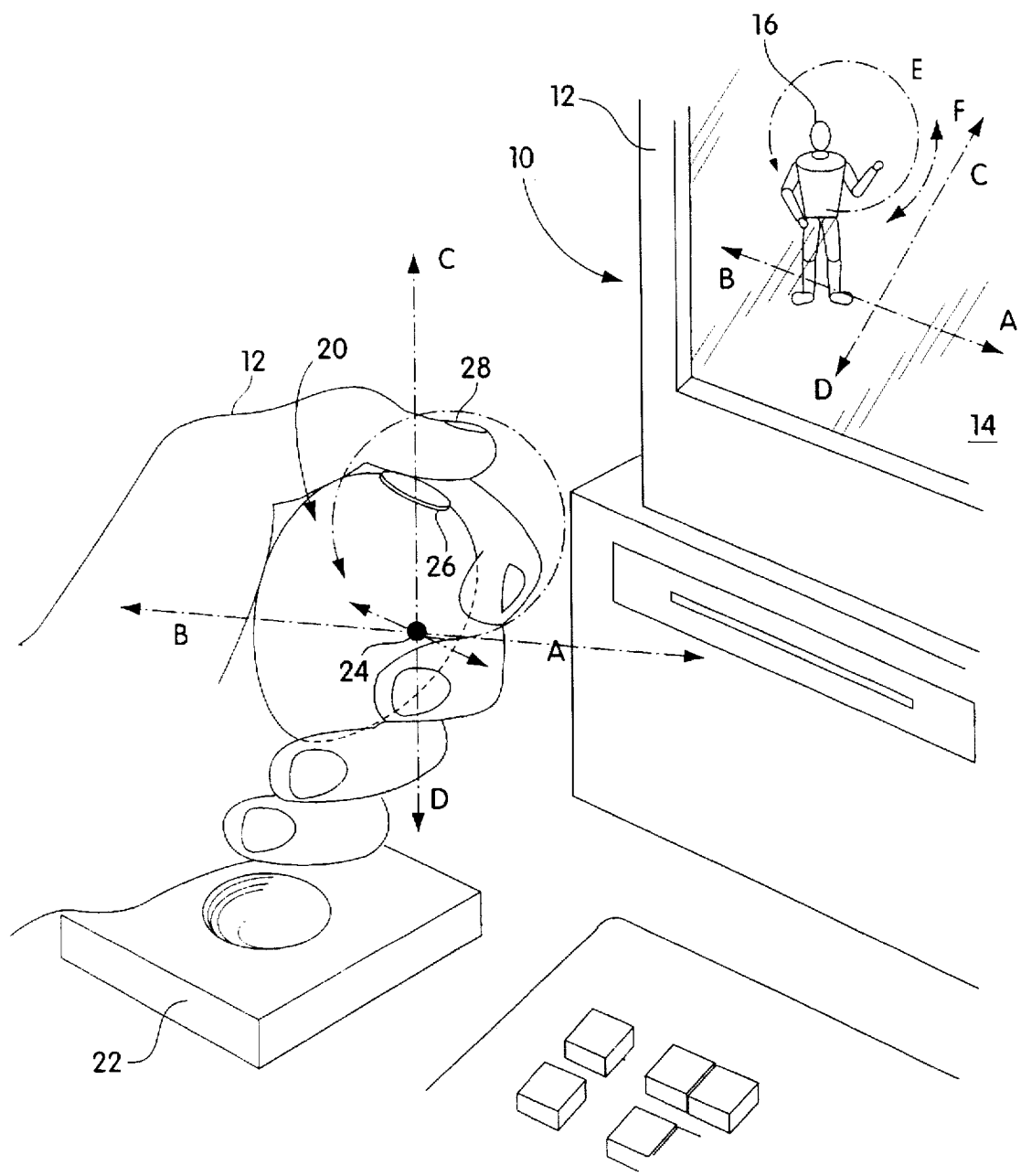
FIG. 1 is a diagrammatic illustration of the subject egg-shaped computer control device illustrating movement of the device and corresponding motion and persona control of the individual's on-screen character.

Referring now to FIG. 1 in a typical electronic meeting place scenario, a computer generally indicated at 10 includes a monitor 12 having a screen 14 in which a cartoon character 16 is depicted. In order to control the movement or persona of character 16, a hand-held device 20 generally in the form of an egg is grasped by a hand 21 so that the egg, when picked up from its holder 22 can be made to move generally in the directions indicated by A, B, C, D, E, and F thereby to effectuate control of character 16, in one embodiment, in corresponding directions.

It will be appreciated that while the subject invention will be described in terms of the aforementioned movements, the movements of device 20 may be made to control different motions or personas of the graphical object. However for ease of discussion, it will be appreciated that in the embodiment shown, device 20 when moved from its original rest origin 24 in the direction of dotted arrow A results in movement of character 16 in the direction of dotted arrow A on screen 14. Thus when grasping device 20 and moving it from a rest position towards the right, character 16 moves towards the right at a predetermined speed and for a predetermined length of time.

Likewise when device 20 is moved to the left as indicated by dotted arrow B, then character 16 is made to move backward as illustrated by dotted arrow B on screen 14.

In a like manner with device 20 moved from a rest position in an upward direction as illustrated at C, then character 16 can be made to move away from the plane of the screen, whereas for a movement of device 20 from a rest position in a downward direction as illustrated by dotted arrow D, the character may be made to move towards the screen.

Of course, if the device is made to move in a circular pattern as illustrated by dotted arrow E, the character, in one embodiment, may be made to do a flip as illustrated by dotted arrow E on screen 14.

While the above relates to motions of the character, it is possible for instance to provide the character with an agitated state by moving the device back and forth in the direction of dotted arrow F in a shaking motion which, inter alia, could make the character 16's hand to move back and forth as illustrated by double-ended arrow F on screen 14.

What will be appreciated is that movement of device 20 in free air results in a predetermined motion or characteristic of the corresponding on-screen character or graphical object, with there being no tethering of the device to the computer-driven display, and without contact of the device with a fixed structure or object such as a mousepad.

As will be described in connection with FIG. 2, device 20 may be provided with accelerometers to sense the motion of device 20, with the outputs of the accelerometers being analyzed to determine the accelerations of the device. In order to eliminate false actuation, device 20 is provided with a switch 26 depressable by thumb 28 such that only those motions are detected which occur during the depression of the switch.

While the subject invention will be described in terms of accelerometers, it will be appreciated that any means for sensing the motion of device 20 is within the scope of this invention. Whatever motion detection system is utilized, the actuation thereof via a switch on the device eliminates false indications of motion regardless of cause.

Figure 2:
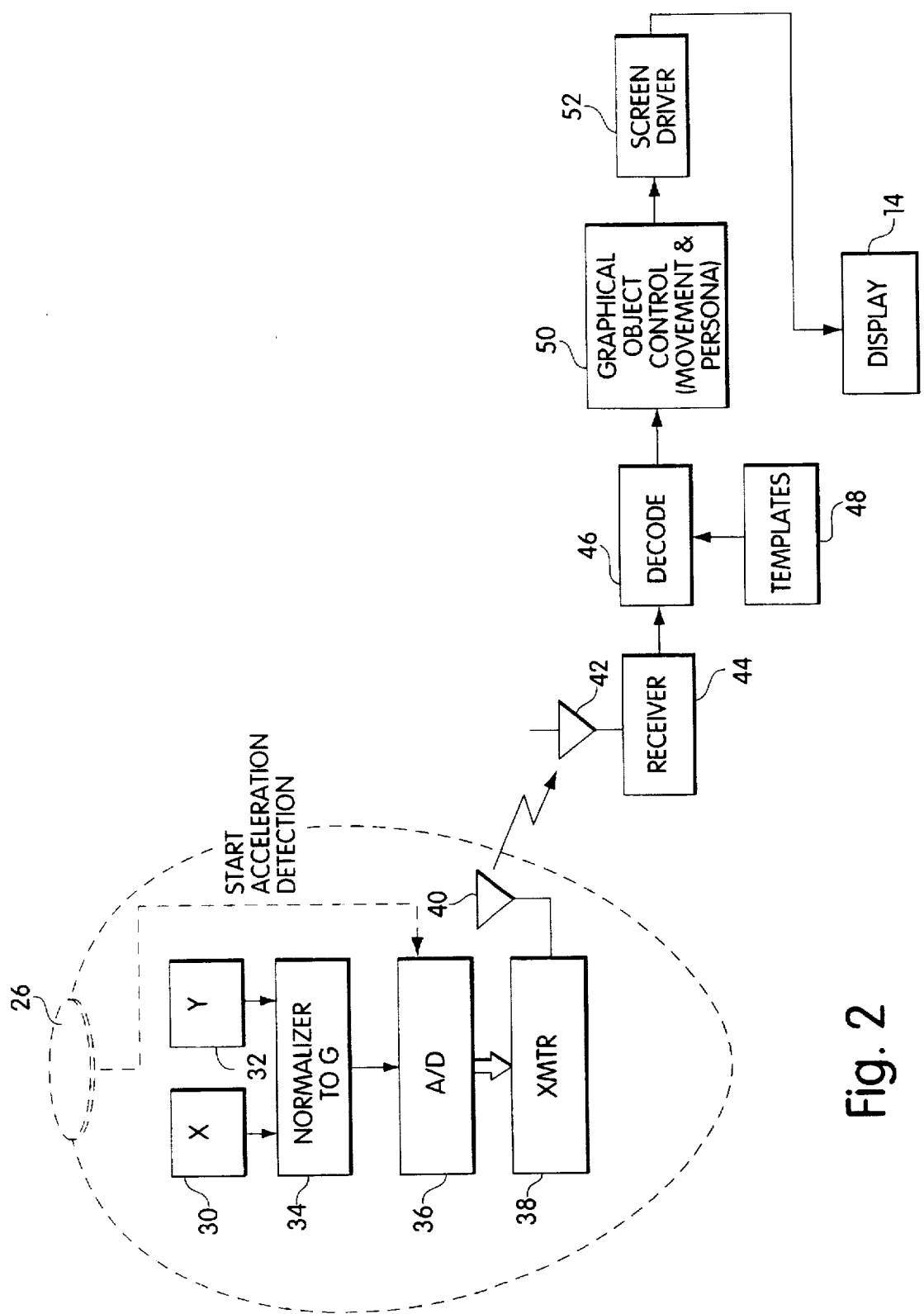
FIG. 2 is a block diagram of the subject system illustrating the detection of device accelerations, the conversion of the analog accelerations to a digital format, the transmission of the acceleration information to a receiver and the decoding of the information to provide graphical object control.

Referring now to FIG. 2, device 20 includes orthogonally oriented accelerometers 30 and 32 oriented respectively in the X and Y directions, the outputs of which are normalized to the local gravitational field vector G by unit 34 to make device 20 orientation independent.

The raw accelerations, normalized to the local gravitational vector, are converted from analog form to digital form by an analog-to-digital converter 36, with the output of converter 36 being transmitted via transmitter 38 and antenna 40 to antenna 42 and receiver 44. The output of receiver 44 is decoded at 46 to ascertain the particular motion which has occurred via comparison of the accelerations transmitted to receiver 44 with accelerations corresponding to templates 48 which have been prestored in a training phase. The matching of the sensed accelerations with the template accelerations results in a decoded signal being applied to a graphical object control unit 50 which provides drive signals to a screen driver 52 to control the movement of a character or graphical object on display 14 as described in connection with FIG. 1.

What is provided is a wireless non-contactual system for controlling the movement or persona of a graphical object in the form of a character through the free-air sensing of accelerations of a hand-held device.

In one embodiment, device 20 is in the form of an egg which automatically establishes an orientation for the device within one's hand. It will be appreciated that the movements allowed in the subject context are in a plane parallel to the plane of the screen, with the X and Y accelerations not only normalized to the local gravitational field but also normalized to a plane parallel to the screen.

It will be appreciated that an additional accelerometer in a direction orthogonal to the first two directions, such as the Z axis, permits the generation of three acceleration vectors, thereby to extend the number of hand motions which can be recognized by the system.

Figure 3:
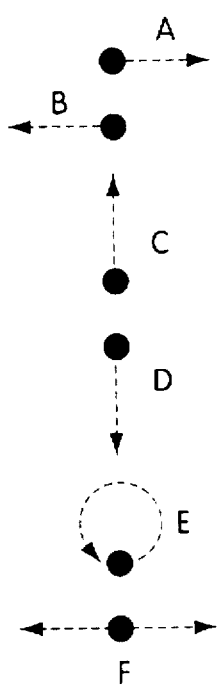
FIG. 3 is a series of vector diagrams illustrating the motions that provide graphical object control for the graphical object of FIG. 1.

Referring to FIG. 3, it will also be appreciated that the motions of device 20 of FIG. 1 which are utilized to control graphical object 16 are those indicated by the dotted arrows. In this case, six motions of device 20 of FIG. 1 are recognized as motions which can effectuate different control scenarios for the graphical object.

Figure 4:
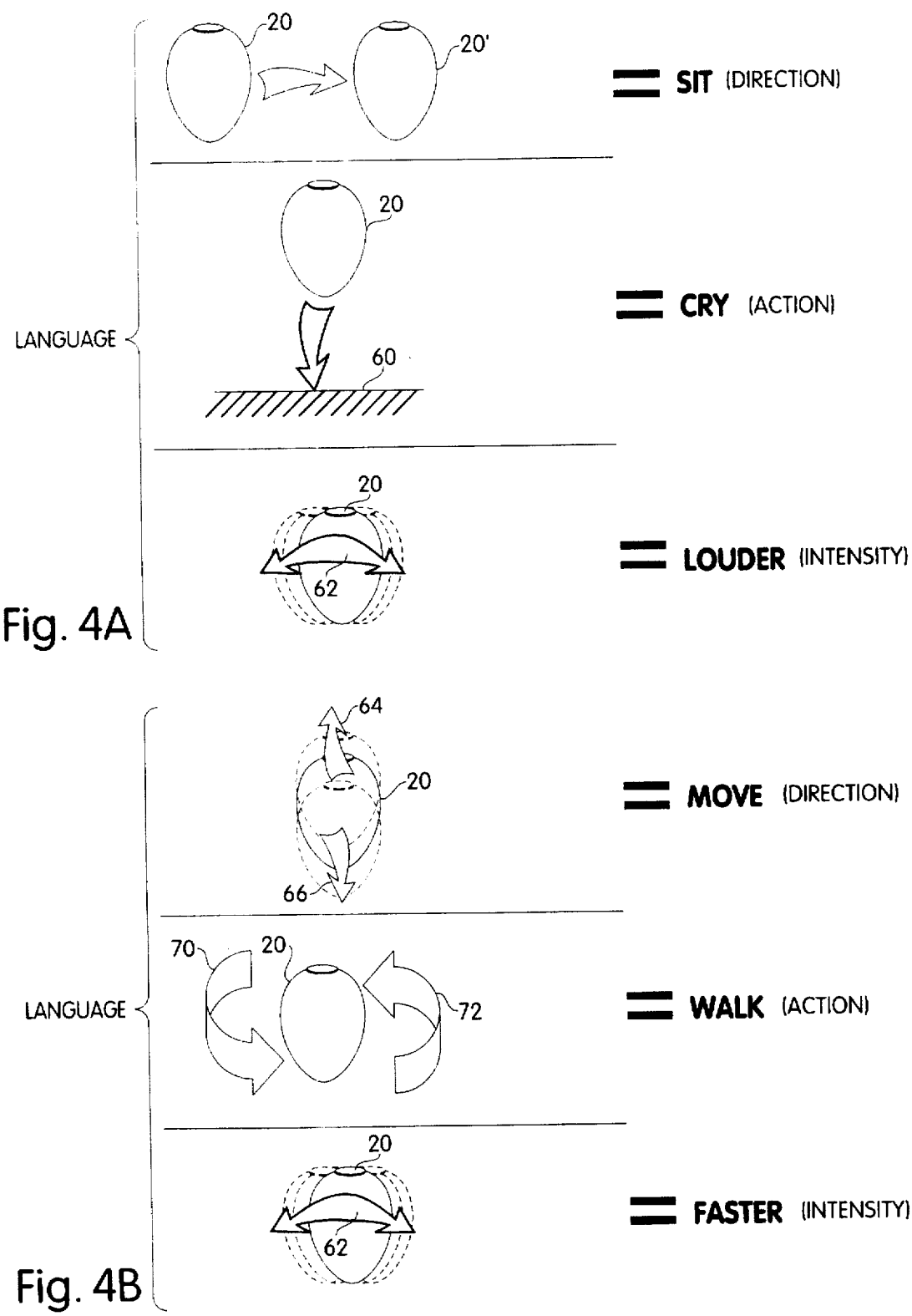
FIGS. 4A and 4B illustrate a language comprising a series of device movements which either individually or serially provide for graphical object control, in which in one embodiment the language includes a movement to specify direction, followed by a movement to specify an action and followed by a movement to specify an intensity, all for the control of the graphical object.

Referring now to FIG. 4A, note that a different sequence or series of motions of device 20 can result in a language to control the on-screen character to execute complex actions. For instance, as illustrated in FIG. 4A, the on-screen graphical object corresponding to a character can be made to sit, cry, and to do so at a loud intensity. In this case device 20 is moved to the right to signify through the detection of its accelerations a sit control signal. The first movement of device 20 in general indicates a movement of the graphical object. Thereafter, device 20 may be moved downwardly to pound against a fixed surface 60, thereby setting off a number of undamped transients to provide signals to control the graphical object to cry. The intensity of the crying may further be controlled by the movement of device 20 in the shaking motion illustrated by double-ended arrow 62 to indicate that the action described in the second of the device 20 motions is to be more intense, whatever that action is.

A language is therefore developed in which a first motion of device 20 may be a direction for the graphical object to move, whereas the second motion of device 20 may specify an action, in this case crying with tears coming down from the eyes of the on-screen character. Finally, a further detected motion may be utilized to control the intensity of the action, in this case, the crying.

Such a language is also illustrated in FIG. 4B in which movement of device 20 up and down as illustrated by arrows 64 and 66 causes a movement of the graphical object, whereas quick rotation of device 20 in a subsequent move in the direction of arrows 70 and 72 causes a walking action of the on-screen character. Finally the same motion of device 20 as that illustrated at the bottom of FIG. 4A causes the intensity of the action, in this case walking, to be faster.

What will be appreciated is that by a series of device movements, various actions and personas can be imparted to the on-screen character.

Figure 5:
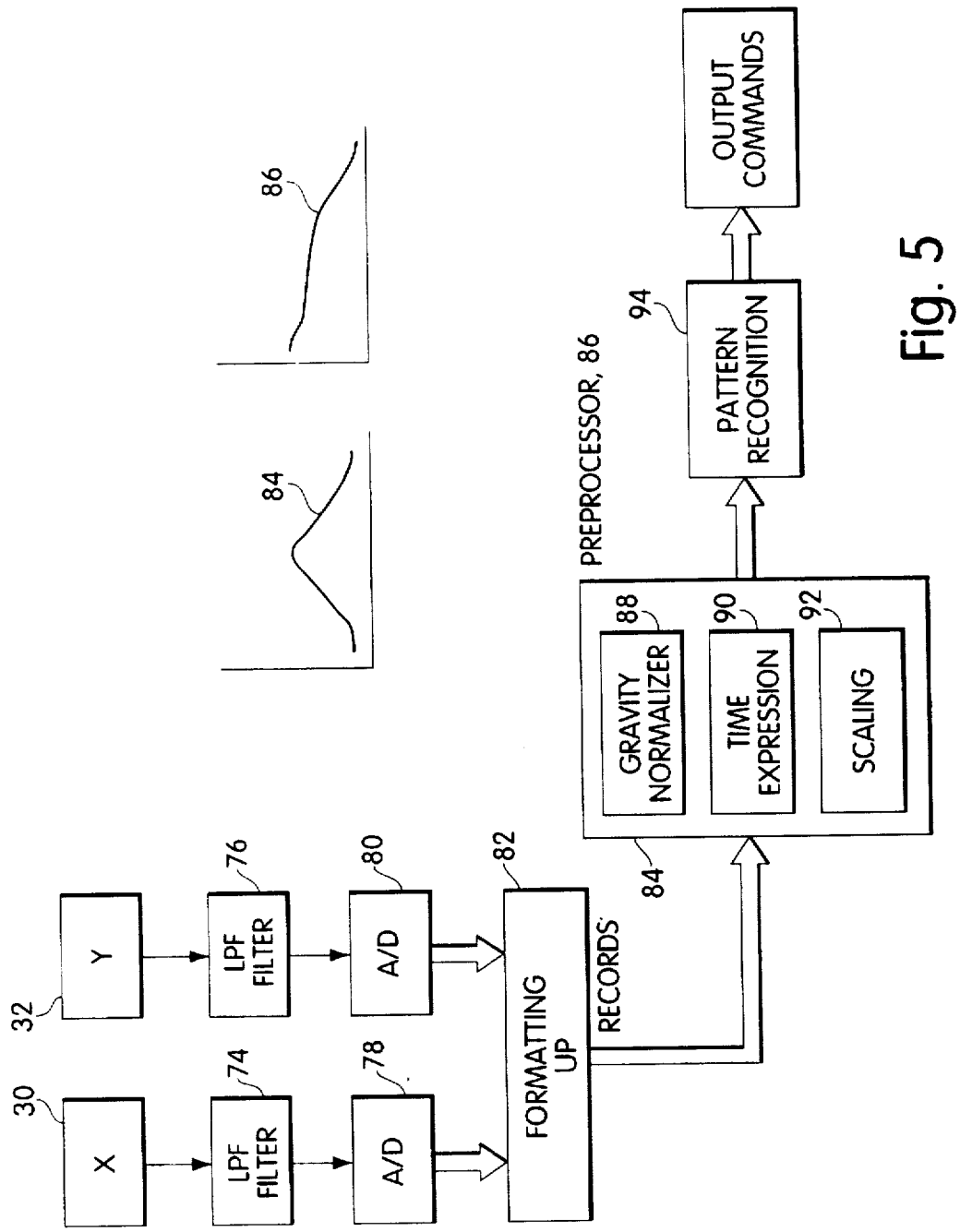
FIG. 5 is a block diagram of the subject system illustrating preprocessing functions.

Referring now to FIG. 5 in more detail, accelerometers 30 and 32 are conventional monolithic accelerometers with signal conditioning. These devices are available from Analog Devices of Norwood, Mass. as model ADXL 50. Accelerometers of this type have general application for airbag deployment in which accelerations produce output voltages from 0 to 5 volts, plus or minus 50 G. The frequency response of these accelerometers is DC to 1 kilohertz. It will be appreciated that with a sampling rate of 244 hertz, the Nyquist limit is 122 hertz. In order to provide a robust system, low pass filters 74 and 76 filter out responses above 72 hertz which in general are undetectable by the subject system, with the filters also filtering out any 120 hertz noise due to 60 cycle AC power supplies.

The outputs of filters 74 and 76 are applied to analog-to-digital converters 78 and 80. In one embodiment these analog-to-digital converters are 8 bit, 0 to 5 volt digital sampling devices in general available as part of a formatting microprocessor 82, manufactured by Motorola Inc. of Scottsdale, Ariz. as Model MC68 HC11. It is the purpose of the analog-to-digital converters to convert the analog outputs of each of the accelerometers as filtered and as illustrated at 84 and 86 respectively into a digital format corresponding to records. In one embodiment the records are 4 bytes long, with 1 byte for each accelerometer, 1 byte reserved and 1 byte for time stamp and phase information for the beginning and end of a record. The output of microprocessor 82 is provided to a host computer 84 which provides a number of preprocessing functions as illustrated at 86. The first of the preprocessing functions is a gravity normalization function as illustrated at 88. In order to accomplish this, the data is subjected to high-pass filtering to separate out data above and below 0.1 hertz. The data below 0.1 hertz is deemed to be gravitational data, whereas the data above 0.1 hertz is deemed to be user data. It is then possible to subtract out the gravitational component from the user data to provide data normalized to the gravitational field. It will be appreciated that all the data can be represented as an X, Y vector with the gravity information being in a given direction and the user data in another direction. The combination of these two vectors yields an angle by which the user data may be rotated to move from device coordinates to real world coordinates specified by the gravitational vector. In this manner, graphical object control can be made independent of device orientation within the hand.

It will be appreciated with orthogonally-oriented accelerometers that the orientation of the device within one's hand is irrelevant. However, when a third accelerometer is utilized in a mutually-orthogonal direction to the directions of the first two above-mentioned accelerometers, then it may be important to be able to establish, other than by gravity, an up direction for the device for specifying a rotation about the device's longitudinal axis.

In terms of the shape of the computer control device, an important reason for an egg shaped or non symmetrical device is to give the user a feedback as to what, in his perception, is an up or down direction or in fact any other predetermined direction. While the system described above does not require foreknowledge of device orientation, it is convenient for the user in effectuating the hand movements he desires to believe that direction makes a difference in terms of the device he's holding. In short, the asymmetrical egg gives the user a means of telling the computer a given direction.

Preprocessor 86 also provides a time expansion function as illustrated at 90 in which all gestures are normalized to a time scale, for instance, to 2 seconds. Thus if the gesture takes shorter than 2 seconds, its effective length is lengthened to 2 seconds for comparison purposes. In order to accomplish the time expansion, half second pauses of less than one half G are detected to indicate the beginning and end of a gesture, with the accelerations therebetween expanded to this normalized time slot.

Preprocessor 86 prior to gravity normalization and time expansion performs a scaling function as illustrated at 92 to convert numbers from 0 to 255 to an actual acceleration in terms of G. The result is the conversion of accelerations to a negative 3.3 Gs to a positive 3.3 Gs.

The result of the preprocessing is applied to a pattern recognition circuit 94 which forms part of the decoding unit 46 of FIG. 1. The pattern recognition matches the preprocessed accelerations to templates of accelerations which have been previously stored in a training phase such that with appropriate pattern recognition the corresponding output commands are transmitted to graphical object control unit 50 of FIG. 1.

In one embodiment pattern recognition in the subject invention utilizes the K Nearest Neighbor Algorithm, in which the data comes out as 128 numbers which are then compared with the distance between all the previously stored samples as calculated in a 128 degree space. Here the correlation is the Euclidean distance. For example, given that a data point includes 128 different samples corresponding to a single point in a 128 dimensional space, each of the previously recorded samples is represented in 128 dimension space such that when a new point in this 128 dimension space arrives, this data is compared to all previously recorded gestures as points in this 128 dimension space. K is an arbitrary number picked to find a gesture corresponding to that set of points which is closest to a previously recorded gesture. It has been found empirically that a good number for K is the square root of the total number of points available. Of the K points found, the gesture detected is that which most quantitatively is represented in the K nearest neighbors.

The K Nearest Neighbor algorithm is used to perform the pattern recognition computation required to classify a new control device movement as matching a particular recorded gesture. A database or learn set of gestures is first created by repeating each individual gesture or class ten times and recording each instance as an element of the class. Each element is represented by a vector of 128 real numbers. When a new input gesture is to be classified, a Euclidean distance is calculated between it and every element of every class of the learn set. These distances are then sorted in ascending order. A K value is then calculated as the square root of the size of the learn set as recommended by Devijer & Kittler, *Pattern Recognition Theory and Applications*, New York, Springer-Verlag, 1987, and whichever class is most numerous in the first K distance values is determined to be the matching gesture.

The Euclidean distance between two 128 dimensional vectors, is defined as the square root of the sum of the squares of the difference of each value:

$$\text{square\_root}\,((A1-B1)+(A2-B2)^2+\ldots+(A128-B128)^2)$$

A simple algorithm for identifying pauses in movement is used to separate gestures for pattern recognition. A pause is defined as motion less than 5.0 m/(s*s) for a minimum duration of 0.4 seconds. A gesture consists of the motion between two pauses, and is limited to 2 seconds. Gestures that take longer than 2 seconds to complete are ignored.

Figure 6:
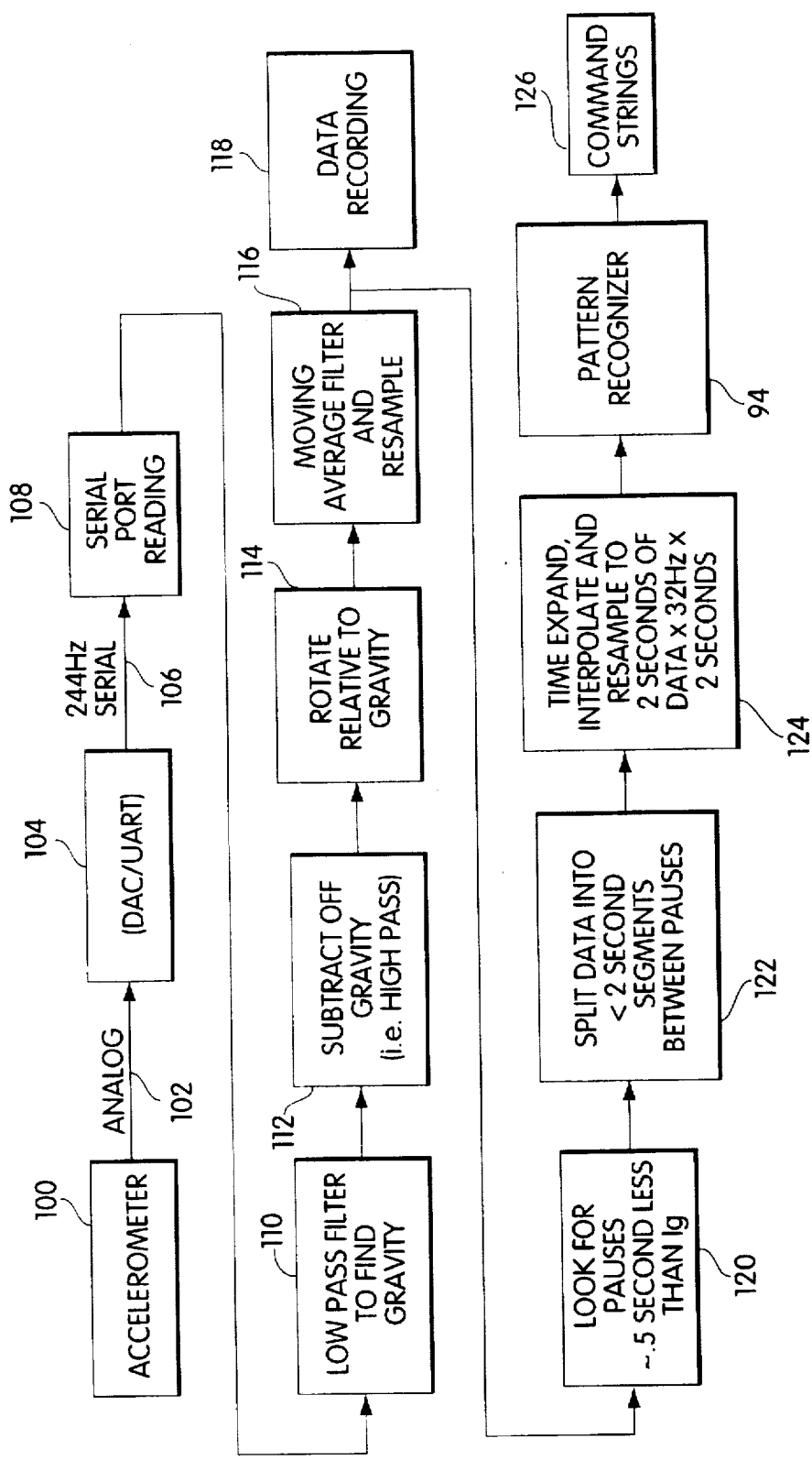
FIG. 6 is a more general block diagram of the subject system.

More generally and referring now to FIG. 6, the subject process can be described as follows. From a more general point of view, accelerator 100 provides an analog signal 102 which is low pass filtered and applied to a DAC/UART 104 which is the aforementioned 6811 microprocessor to provide a serial output 106 coupled to the serial reading port 108 of the aforementioned host computer. The output of the serial port is low pass filtered to find gravity at 110, with the gravity being subtracted off via a high-pass filter function 112 to reference the accelerations to the local gravitational field as illustrated 114. This data, having been sampled at 244 hertz is resampled at 30 hertz via a moving average filter 116, the output of which is recorded at 118 for future gesture recognition.

The output of filter 116 is also applied to a unit 120 which seeks to normalize the gesture detection system by looking for pauses to separate the gestures, in one embodiment by looking for one half second pauses of less than one half G. Thereafter the data is split into less than 2 second segments, that being the arbitrary length of analysis for gesture recognition at 122. Time expansion is accomplished at 124 through an interpolation and resampling normalized on the 2 second interval. The result is a 128 data point vector with data sampled at 32 hertz times 2 sensors and 2 seconds. The output is applied to the aforementioned pattern recognition unit 94 to produce the output commands or command strings.

Figure 7:
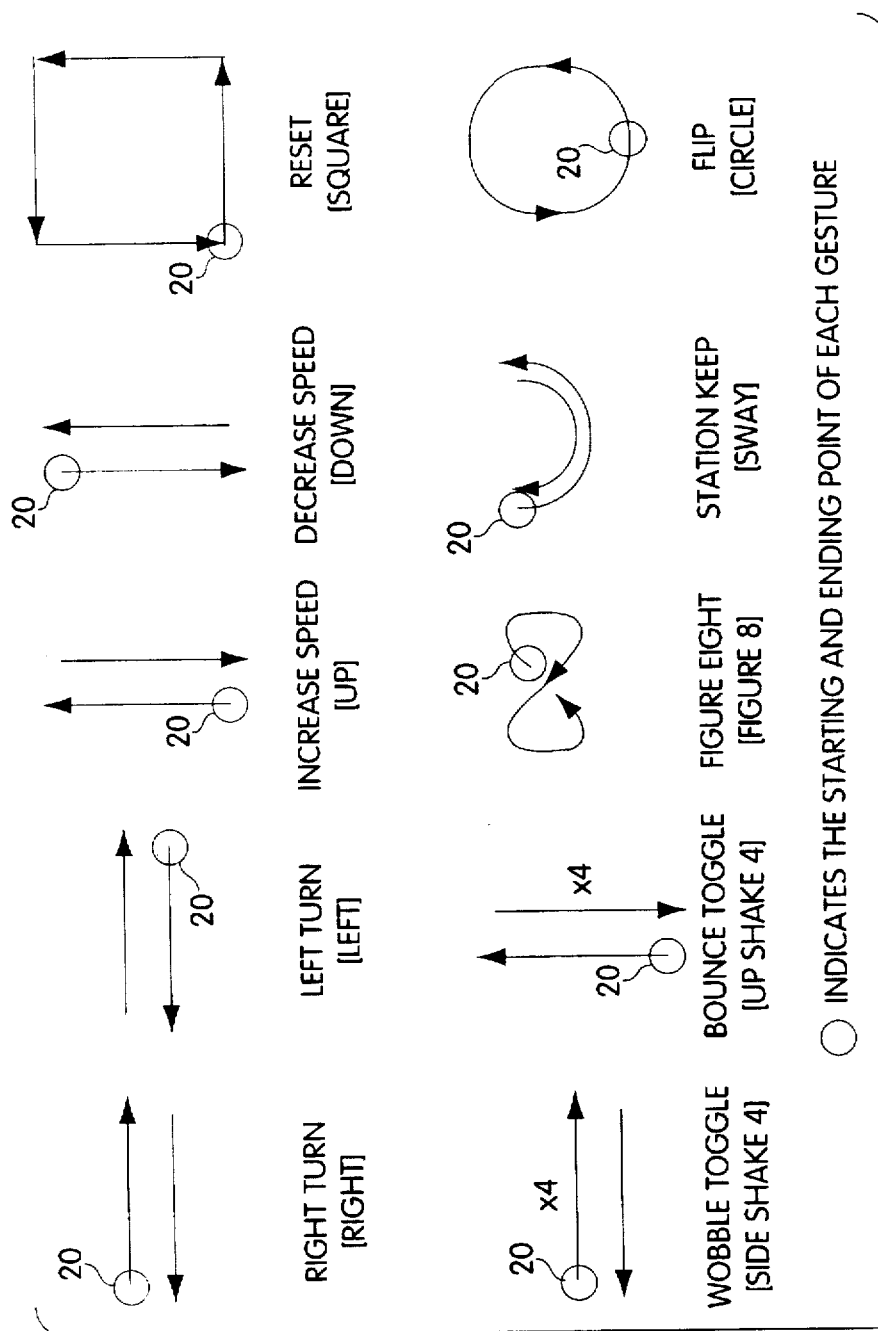
FIG. 7 is a series of diagrams describing the motion of the computer control device to achieve the indicated on-screen action of a predetermined character or icon.
Figure 8A:
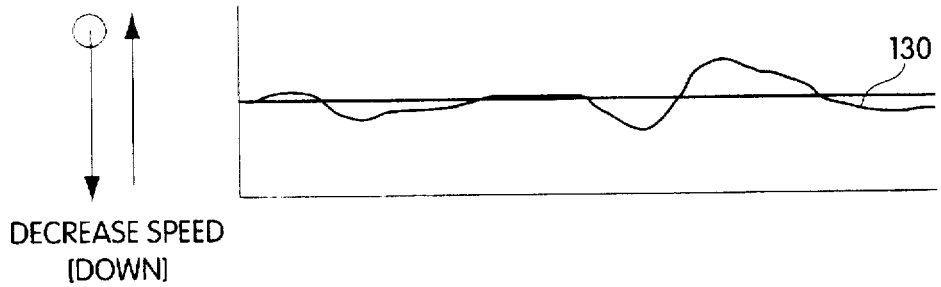
FIG. 8A-8J are combined acceleration waveforms derived from the raw accelerations from orthogonally oriented accelerometers within the computer control device of FIG. 1, with the waveforms corresponding to various motions of the computer control device to effectuate the indicated on-screen character control.
Figure 8B:
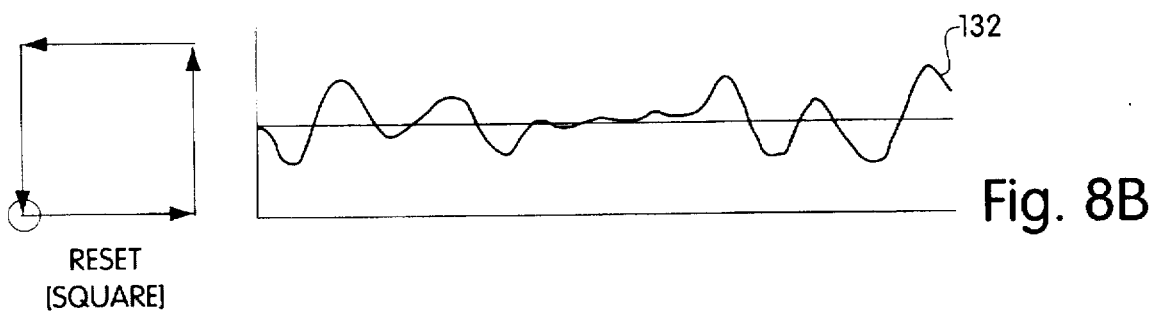
Figure 8C:
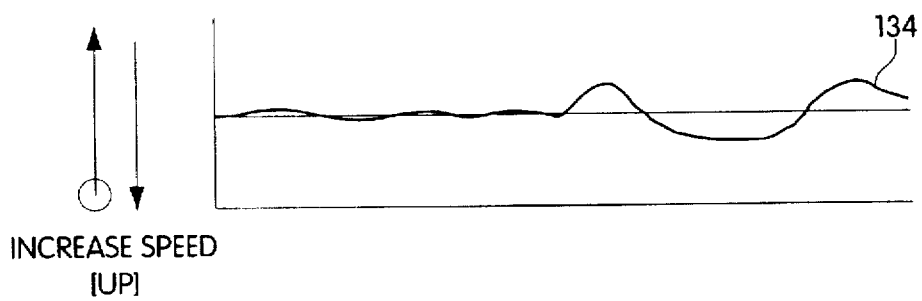
Figure 8D:
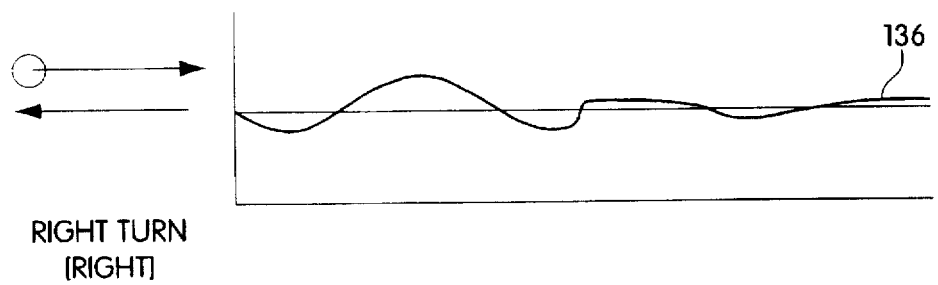
Figure 8E:
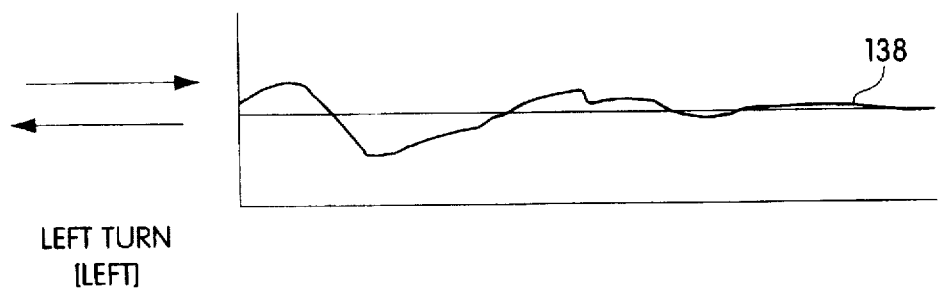
Figure 8F:
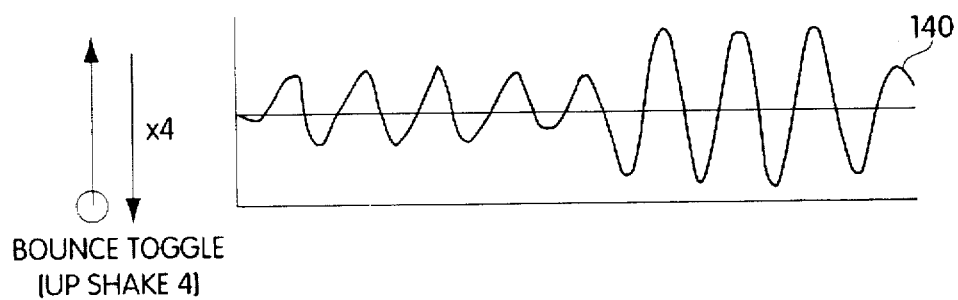
Figure 8G:
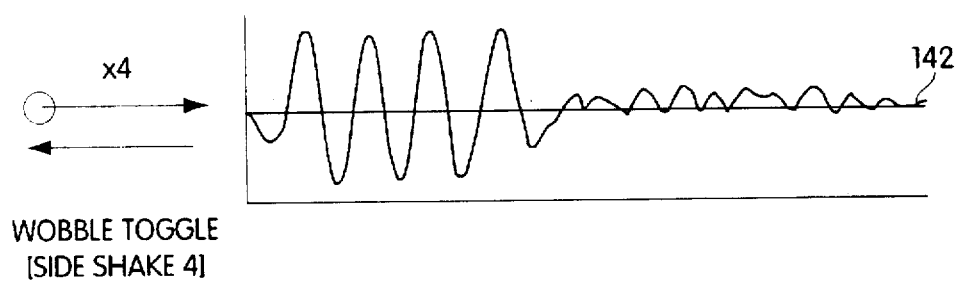
Figure 8H:
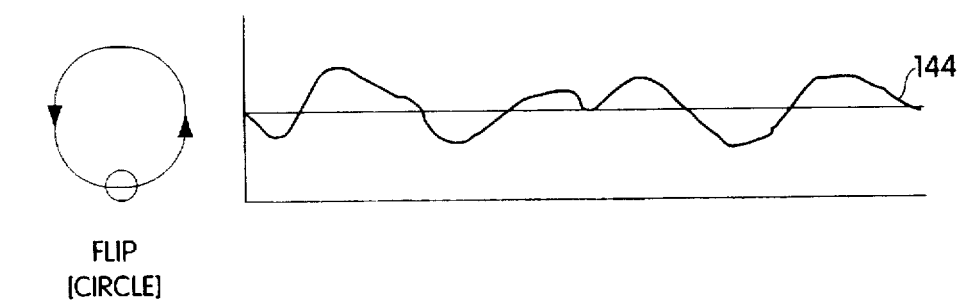
Figure 8I:
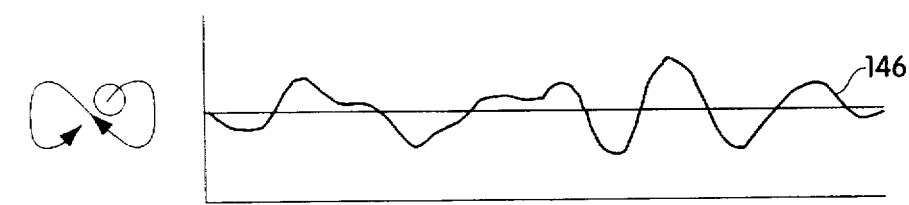
Figure 8J:
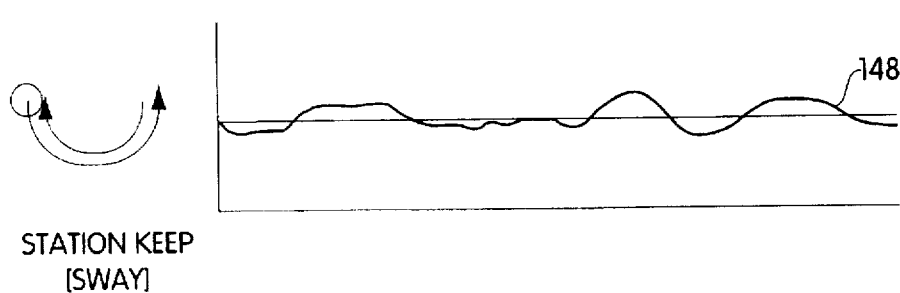

Referring now to FIG. 7, various movements of the computer control device result in various prescribed on-screen motions for the character or icon. For instance, movement of hand-held device 20 quickly to the right and then to the left indicates to the system that a character right turn is required. A left turn is illustrated when device 20 starts to the left and moves to the right. On the other hand, an increased speed is dictated by an upward movement of the device 20 followed by a downward movement of the device, whereas decreased speed requires first downward movement of the device and then upward movement. A reset gesture is one in which the device 20 is moved in a square as illustrated, whereas to get the character to wobble and therefore toggle between wobbled stages, one shakes device 20 sideways four times as illustrated by the arrows. A bounce toggle results when device 20 is shaken in an upward direction four times. Moreover, the character can be made to do a figure eight on-screen by moving device 20 in the figure eight illustrated. A station keep or sway motion is illustrated in which a swaying motion of device 20 results in the desired on-screen movement. Finally, a circular motion of device 20 in one embodiment causes the character to flip over.

What can be seen is that with a prescribed movement or gesture, the character can be made to perform on-screen that which the gesture controls.

Referring now to FIGS. 8A-8J, each of these movements of device 20 is placed beside a graph of accelerations from the orthogonally-oriented accelerometers which are the combined outputs of the accelerometers in one embodiment. The first part of each waveform corresponds to the output of one accelerometer, with the second part corresponding to the output of the second accelerometer. As can be seen, there are distinctive waveforms which are the result of moving device 20 in the specified directions. It is possible through the technique described above or with standard curve matching to be able to distinguish between each of these control motions and to be able to effectuate on-screen character control.

Note that the decreased speed waveform is illustrated at 130, the reset waveform illustrated at 132, the increased speed waveform at 134, the turn-right waveform at 136, the turn-left waveform at 138, the bounce toggle waveform at 140, the wobble toggle waveform at 142, the flip waveform at 144, the figure-eight waveform at 146, and the sway keep waveform at 148.

What will be appreciated from the aforegoing is that it is possible to match detected accelerometer waveforms with a training set of waveforms to be able to specify the action of the on-screen character.

In an alternative embodiment, once a movement has been determined, the style or emotional content of the movement is specified directly from gross accelerometer output without pattern matching. In this embodiment accelerometer outputs are directly mapped to certain parameters which are used to select which of a number of emotions the on-screen character is to exhibit.

Figure 9:
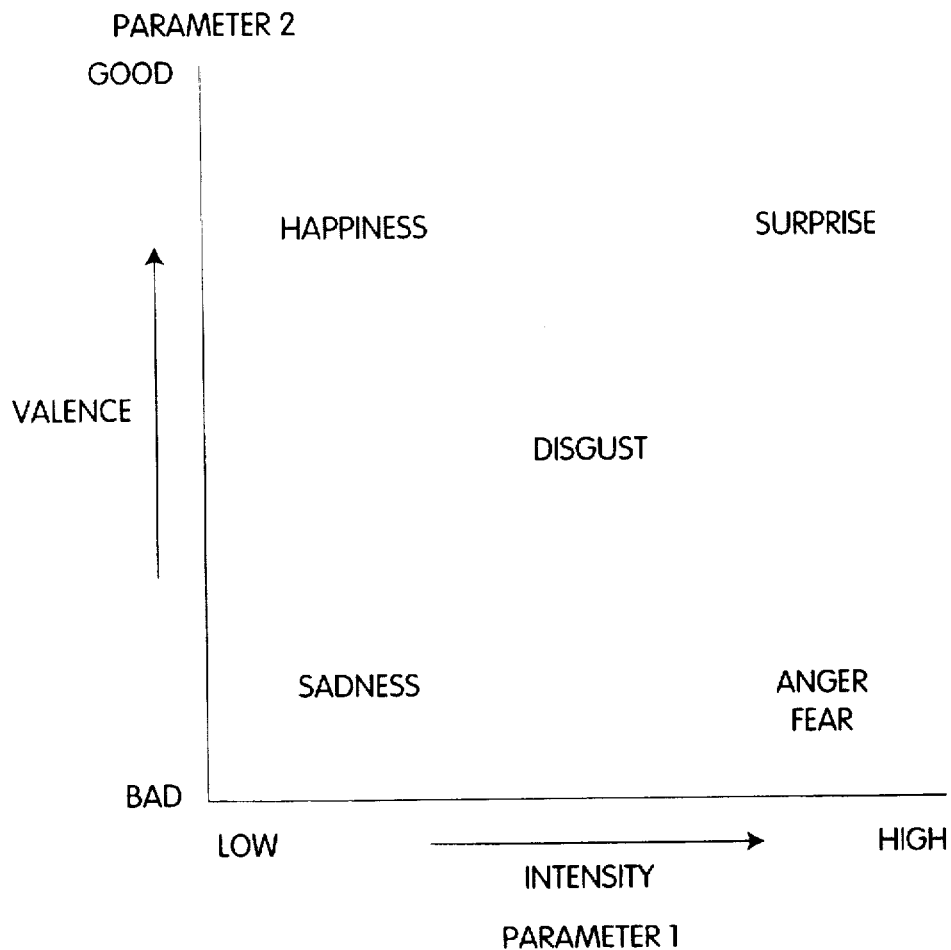
FIG. 9 is a graph of intensity of action versus valence for specifying an entire range of human emotion to arrive at a set of parameters to control the emotive content of an on-screen character.

Referring now to FIG. 9, the range of human emotion can be graphed as illustrated in which valence, the range between "good" and "bad" is graphed against intensity such that such emotions as happiness versus sadness, surprise versus disgust, and anger versus sadness can be specified by intensity on the abscissa and valence on the ordinate. To this end the outputs of the two accelerometers can be directly used to specify a value for valence and a value for intensity, thus selecting a particular emotion.

Figure 10:
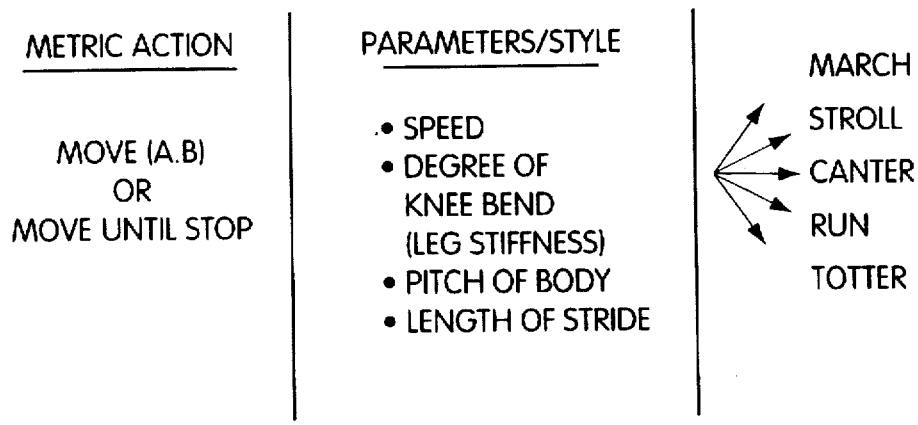
FIG. 10 is table listing actions in terms of movement versus style to provide control of a perambulating on-screen character as to emotive style.

Having decided that various emotive content can be specified in terms of intensities and valences, it will be appreciated as illustrated in FIG. 10 that given a particular movement or action, this action can be performed in accordance with a predetermined emotional style. In an alternative embodiment, a different set of output parameters can be directly controlled by the accelerometer outputs. As can ben seen in FIG. 10, the style of a metric action such as "move" or "move until stop" can be altered in accordance with a parameter/style factor which dictates for instance the speed of the action, the degree of knee bend, the pitch of the body, and the length of the stride. The result is a style of movement which can be controlled for instance from a march to a stroll, to a canter, to a run, and to a totter.

Figure 11:
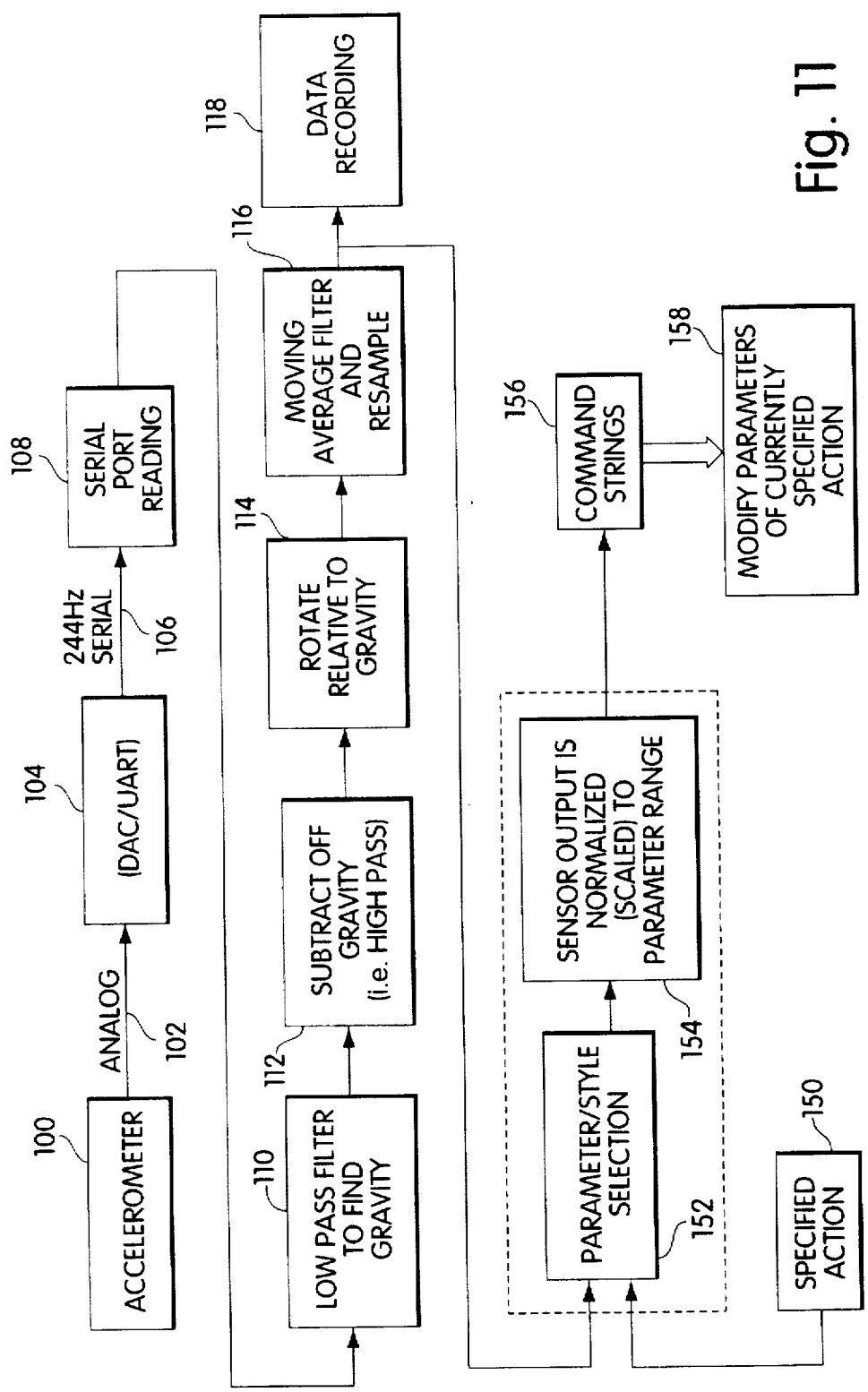
FIG. 11 is a block diagram of one embodiment of the subject invention in which accelerometer outputs are used directly to control the style of a specified action without curve matching; and, FIG. 12 is an overall block diagram illustrating direct style/parameter control.

This being the case, it is possible to control not only the movement of the character but also the style in which the character moves on-screen. As a result and referring now to FIG. 11, it is possible once having specified a particular action such as a walk or run, or, etc., as illustrated at 150, the output from the accelerometers may be used directly to select a parameter or style as illustrated at 152 such that when this parameter or style is normalized or scaled to a particular parameter range at 154, command strings 156 are generated to modify the parameters of the currently specified action as illustrated in 158.

What this means is that assuming a walking action has been the specified action, then by simple movements of device 20, the accelerometer outputs may be interpreted without waveform matching and merely utilized to control the intensity of the specified action, or any other parameter which is convenient.

Figure 12:
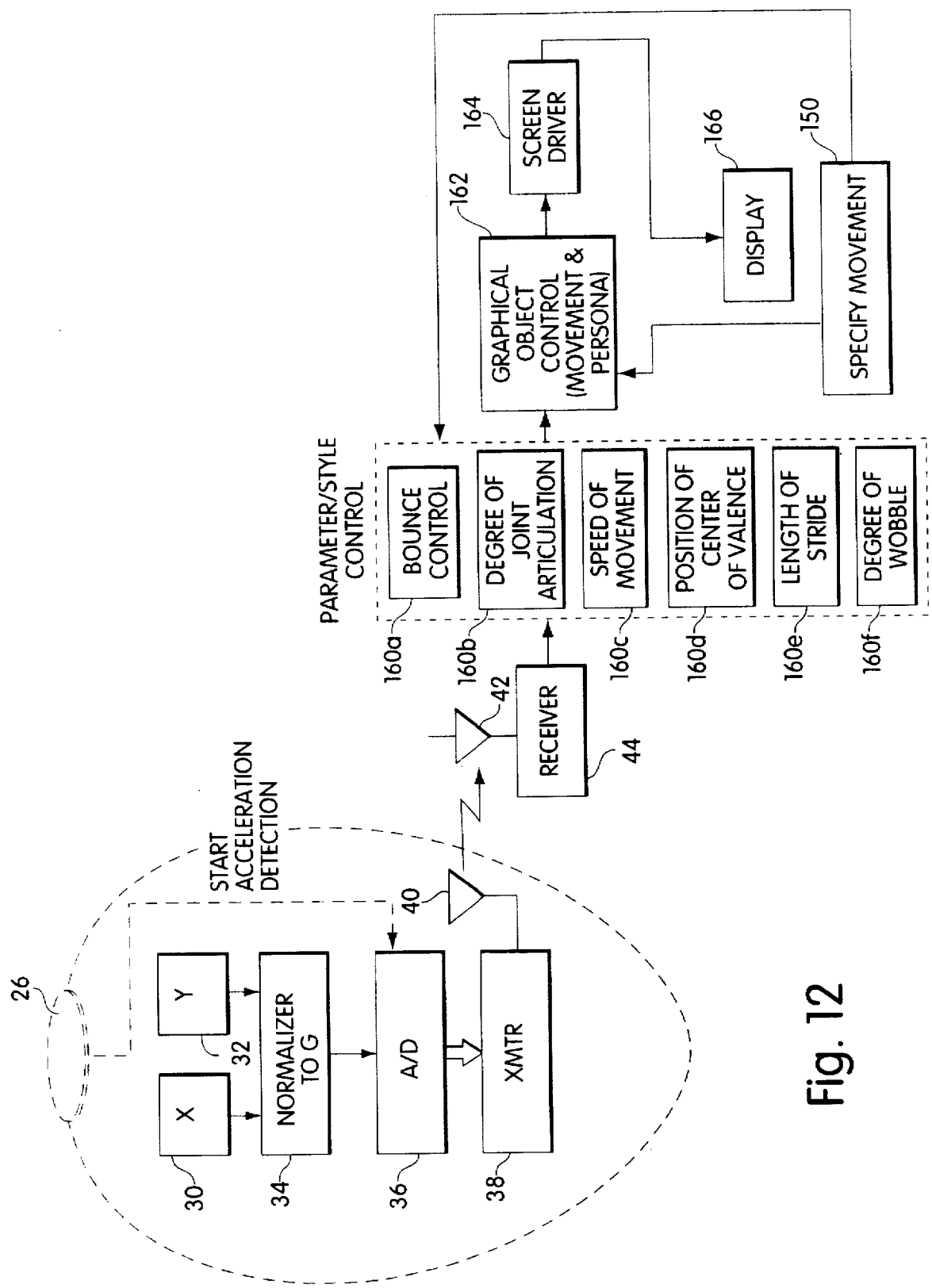

For instance, referring now to FIG. 12, the types of parameters which may be changed in accordance with the output of parameter/style control 160 in order to effectuate changes in the specified movement or action 150 are bounce 160a, the degree of joint articulation 160b, speed of movement 160c, position of center of balance 160d, length of stride 160e, degree of wobble 160f, or any other type of parameter. Thus once the movement has been specified and a graphical object control 162 has had the appropriate inputs, then the screen driver 164 is utilized to drive display 166 such that not only is the on-screen character performing the specified movement or action, it also does so with the particular style or parameter specified by the direct utilization of the accelerometer outputs without pattern matching.

Thus, the hand-held device can be used either to specify the desired motion of the on-screen character or icon through pattern matching, or the hand-held device can simply specify style for on-screen character movement, once a particular movement has been selected.

A program listing in C is now presented to further describe the operation of the system:

sgest.c

```c
/*******************************************************/
/*
 * Main entry point to wand.
 *
 * Darrin B. Jewell (jewell@bdi.com)   Fri Nov 18 01:36:06 1994
 *
 *
 */
/*******************************************************/ ifndef _POSIX_SOURCE
define _POSIX_SOURCE
endif include <stdio.h>
include <errno.h>
#include <string.h>
#include <stdlib.h>
#include <unistd.h>
#include <signal.h>
#include <time.h>
#include <assert.h>
include <math.h>

/* for select */
#include <sys/types.h>
include <sys/time.h> ifdef iris5                       /* hack to get select under POSIX */
include <sys/select.h>
endif include "serio.h"                 /* serial port reading */
include "ldata.h"                 /* data file handling */

/*******************************************************/ if (defined(sun4))
define SIO_PORT  "/dev/ttyb"      /* Don't put in parens */
#else
#if (defined(iris) || defined(iris5))
#define SIO_PORT  "/dev/ttyd2"     /* Don't put in parens */
#else
#define SIO_PORT  "/dev/ttys2"     /* Don't put in parens */
#endif
#endif
/*
 * SIO_PORT defines the filename of the serial port
 * device the wand is connected to.
 */ define SCALE_X    ((7.4 * 9.8) / 256.0)
define SCALE_Y    ((7.4 * 9.8) / 256.0)
#define OFFSET_X   (-128.0 * SCALE_X)
#define OFFSET_Y   (-128.0 * SCALE_Y)
/* SCALE and OFFSET factors are used to convert
 * The units of the wand sensors. (currently
 * calibrated to produce [0 to 255] for
 * accelerations of -3.3 to +3.3 g's)
 *
 * Scale is applied first and then the offset.
 * They convert to m/s^2 which is what we use
 * for comparison and is what is saved into
 * the gesture data files.
``` sgest.c

```c
*/ define NPTS (64)
/* The number of (x,y) data points to send to
 * the gesture recognizer.
 * This is a little more than 2 seconds worth of data.
 * (64 / 30.5 Hz) = 2.1 seconds.
 */ define SUBSAMPLE (8)
/* SUBSAMPLE is the rate at which we resample the data using
 * a moving average low pass filter.
 * In this case, the input from the wand is SAMPLE_HZ
 * (currently set at about 244 hz)
 * and and a subsample rate of 8 gives us (244 / 8) = 30.5 Hz.
 */ define MAG_ZERO_TH   (5.0)         /* m /s^2 */
define MAG_ZERO_TIME (0.4)         /* seconds */
/* These two MAG_... defines control the thresholds
 * for recognizing pauses between gestures.
 * A pause is defined as a magnitude of less than MAG_ZERO_TH
 * for at least MAG_ZERO_TIME duration.
 *
 * MAG_ZERO_T is just set from the above values.
 */
#define MAG_ZERO_T  ((int)((MAG_ZERO_TIME*SAMPLE_HZ) /((float)SUBSAMPLE)))

/*
 * POSIX and ANSI C don't actually call for PI to be defined,
 * but we need it anyway.
 */
#if (! defined(M_PI))
#define M_PI (3.14159265358979323846)
endif /*
 * The maximum number of data files that can be
 * used to the command line.
 */
#define MAX_GESTURES (100)

/*************************************************************/
/* These functions are the entrance to the pattern recognizer */ extern void sif_init(int fc, char *fv[]);
extern void sif_report(int fc, char *fv[],float *match);
extern void sif_cleanup(void);

/*************************************************************/
/* command line */ void
usage(char *progname)
{
    fprintf(stderr,
            "usage: %s [-port <portname>] [-gest <outfile>] [<datfile>]\n",
            progname);
    fprintf(stderr,"\t -port defaults to %s\n",SIO_PORT);
} char *cmdl_idaf = NULL;
char *cmdl_port = NULL;
int   cmdl_filec = 0;
``` usage sgest.c sgest.c

```
char *cmdl_filev[MAX_GESTURES];

int
parse_cmdline(int argc, char *argv[])
{
    int i;
    for (i = 1; i < argc; i++) {
        if ((*(argv[i])) == '-') {
            if        (! strcmp("-port",argv[i])) {
                cmdl_port = argv[++i];
            } else if (! strcmp("-gest",argv[i])) {
                cmdl_ldaf = argv[++i];
            } else {
                return(-1);
            }
        } else {
            cmdl_filev[cmdl_filec++] = argv[i];
        }
    }
    if (!cmdl_port) cmdl_port = SIO_PORT;
    return(0);
}

/***************************************************************/

/* read_slow_data()
 *   reads wand input and does some processing.
 *   It calls sio_read() to get records from the
 *   wand attached to a serial port.
 *
 * This
 *
 *
 *
 *
 * reads at most ndta/2 points, but it needs the
 * extra room in xdta and ydta for processing
 */
int
read_slow_data(siof_T *f,         /* sio filehandle */
                int ndta,          /* length of xdta and ydta arrys */
                float *xdta,       /* X accelerometer data array */
                float *ydta,       /* X accelerometer data array */
                int naccum,        /* moving average subsample rate */
                int *na,           /* state variable for moving average low pass subsampler */
                float *xa,         /* state variable for moving average low pass subsampler */
                float *ya,         /* state variable for moving average low pass subsampler */
                float *gx,         /* state variable for x gravity low pass filter */
                float *gy,         /* state variable for y gravity low pass filter */
                float xscale,      /* scale factor for input x sensor data */
                float yscale,      /* scale factor for input y sensor data */
                float xoffset,     /* offset value for input x sensor data (after scaled) */
                float yoffset)     /* offset value for input y sensor data (after scaled) */
{
    sio_rec_T recs[SIO_MAXREAD];
    int nread;
    nread = sio_read(f,recs,ndta*naccum /2);
    if (nread > 0) {
        int nout;
        register int n;

nout = (nread+(*na)) /naccum;
        n = ndta-nout;
```

*parse_cmdline* sgest.c

```c
/* zero accumulators, if apropriate */
if (*na == 0) {
    *xa = 0.0;
    *ya = 0.0;
}

/* shift over all the old data */
{
    register int i;
    for (i = 0; i < n; i++) {
        xdta[i] = xdta[i+nout];
        ydta[i] = ydta[i+nout];
    }
}

/* get, scale and filter the new data */
{
    register int i;
    for (i = 0; i < nread; i++) {
        {
            float x;
            float y;
            /* get new data and scale apropriately */
            x = ((float)recs[i].val1) * xscale + xoffset;
            y = ((float)recs[i].val2) * yscale + yoffset;
            /* filter for gravity */
            *gx = 0.01*x + 0.99*(*gx);
            *gy = 0.01*y + 0.99*(*gy);
            /* subtract off gravity from data */
            *xa += x-(*gx);
            *ya += y-(*gy);
        }
        /* accept average data, rotating relative to gravity */
        if (++(*na) >= naccum) {
            float px;
            float py;
            float pmag;
            float pth;
            px = (*xa /((float)*na));
            py = (*ya /((float)*na));
            pmag = sqrt(px*px+py*py);
            pth = (pmag > 0.0) ? atan2(py,px) : 0.0;  /* relative to device */
            pth -= ((*gx != 0.0) && (*gy != 0.0)) ? atan2(*gy,*gx) : 0.0;
            pth += (M_PI /2.0);

/* Re-map pth to be (-PI < pth <= PI)
             * this should really be done with some varaint of fmod().
             * bfn... it doesn't matter too much since it
             * is guaranteed to be near.
             */
            while (pth  >  M_PI) pth -= 2.0*M_PI;
            while (pth <= -M_PI) pth += 2.0*M_PI;

/* pth is now relative to gravity */ xdta[(i /(*na))+n] = pmag;
            ydta[(i /(*na))+n] = pth;
            *na = 0;
            *xa = 0.0;
            *ya = 0.0;
        }
    }
}
return(nout);
``` sgest.c

```
    }
    return(nread);              /* error or none read */
}

/***************************************************************/
/* This program is intended to be stopped with a
 * Ctrl-C, at which point it saves off it's data
 * file correctly.  If a second Ctrl-C is issued,
 * it will exit in the middle of saving the data file.
 */ static int quit_flag = 0;

static void quit_sighandler(void)
{
    quit_flag = 1;
} static struct sigaction oact;
static struct sigaction act;

static void setup_quit_sighandler(void)
{
    act.sa_handler = quit_sighandler;
    sigemptyset(&act.sa_mask);
    act.sa_flags = 0;

sigaction(SIGINT, &act, &oact);

fprintf(stderr,"Send a SIGINT signal (Typically Ctrl-C) to quit.\n");

quit_flag = 0;
} static void cleanup_quit_sighandler(void)
{
    sigaction(SIGINT, &oact, &act);
}

/***************************************************************/
/* Expand array 2 to array 1 which may be of different
 * lengths.  Linearly interpolates the data values.
 * It makes the first and last values of dta1
 * equal to the first and last values of dta2
 * which I don't think is strictly valid... but that
 * won't hurt is any.
 */
void
linear_interpolate(float *dta1, int dta1n,
                   float *dta2, int dta2n)
{
    assert(dta1);
    assert(dta2);
    assert(dta1n >= 0);
    assert(dta2n >= 0);
    assert(dta1n >= dta2n);
    {
        register int i;
        for (i = 0; i < dta1n; i++) {
            float fidx;
            float frac;
``` sgest.c
sgest.c

```
        int idx;
        fidx = (((float)i) /((float)(dta1n-1)))*((float)(dta2n-1));
        idx = (int)floor(fidx);      /* truncate */
        frac = fidx-((float)idx);    /* take fractional part */
        if (idx == dta2n-1) {
           dta1[i] = dta2[idx];      /* just in case.. so we don't overrun array */
        } else {
           dta1[i] = dta2[idx] + ((dta2[idx+1] - dta2[idx]) * frac);
        }
      }
   }
}

/**************************************************************/ static lda_T *ldata   = NULL;

void
gest_init(void)                                                                 gest_init
{
   if (cmdl_ldaf) {
      ldata = lda_init(2*NPTS, (((float)SUBSAMPLE) / SAMPLE_HZ));
   }
}

/* gest_store()
 * gets handed the processed arrays for storage
 * into data files or for gesture recognition.
 */
void
gest_store(int ecnt, int t, int bgn, int end, float *xdta, float *ydta)         gest_store
{
   char varname[50];

/*   assert(bgn >= 0); */
   assert(end < NPTS);

fprintf(stderr,"Comparing data from run (%d), time (%d) [%d..%d].\n",
           ecnt,t,bgn,end);

if (t < 0) {
      fprintf(stderr,"Not comparing data from negative time.\n");
      return;
   } if (bgn < 0) {
      fprintf(stderr,"Gesture starts before array.  Not storing.\n");
      return;
   }

{
      float match[2*NPTS];
      /* convert from polar back to x/y coordinates */
      {
         register int i;
         for(i=0; i < end-bgn; i++) {
            float mag;
            float th;
            mag = xdta[bgn+i];
            th  = ydta[bgn+i];
            xdta[bgn+i] = mag*cos(th);
            ydta[bgn+i] = mag*sin(th);
         }
``` sgest.c

```
        }
        linear_interpolate(match, NPTS, &(xdta[bgn]), end-bgn);
        linear_interpolate(&(match[NPTS]), NPTS, &(ydta[bgn]), end-bgn);
        sprintf(varname,"m.%03d.%05d.%03d.%03d",ecnt,t,bgn,end);
        if (cmdl_ldaf) {
            if (lda_store(ldata,varname,"no_units",-40.0,40.0, match) < 0) {
                fprintf(stderr,"Unable to store var \"%s\"\n",varname);
            } else {
                fprintf(stderr,"Stored var \"%s\"\n",varname);
            }
        }
        /* now compare.. grr. sprlib takes doubles, not floats
         */
        {
            float dmatch[2*NPTS];
            register int i;
            for (i = 0; i < 2*NPTS; i++) {
                dmatch[i] = match[i];
            }
            sif_report(cmdl_filec,cmdl_filev,dmatch);
        }
      }
    }

/*
 * This must be called when you are done to save
 * off the gestures that were stored by gest_store().
 */
void
gest_save(void)
{
  if (cmdl_ldaf) {
    char tbuf[100];

strncpy(tbuf,cmdl_ldaf,100);
    tbuf[99] = '\0';

fprintf(stderr,"Attempting to write file: \"%s\"\n",tbuf);

if (lda_save(ldata,tbuf) < 0) {
        perror("Error writing file");
        fprintf(stderr,"Failed to write file: \"%s\"\n",tbuf);
    } else {
        fprintf(stderr,"Wrote file \"%s\"\n",tbuf);
    }
    lda_cleanup(ldata);
  }
}

/***************************************************************/ int
main(int argc, char *argv[])
{
  if (parse_cmdline(argc,argv) < 0) {
    usage(argv[0]);
    exit(1);
  } sif_init(cmdl_filec,cmdl_filev);

gest_init();

{
```

*...gest_store*

*gest_save*

*main* sgest.c sgest.c

...main

```
siof_T f;

if (sio_open(&f, cmdl_port) < 0) {
    perror("Unable to open serial port");
    return(1);
}

{
    float *xdta;
    float *ydta;
    long t;
    int npts = NPTS;
    int ecnt = 0;

xdta = (float *)malloc(npts * sizeof(float));
    ydta = (float *)malloc(npts * sizeof(float));
    assert(xdta && ydta);

setup_quit_sighandler();

while (! quit_flag) {
        int error_flag;
        float xa;
        float ya;
        float gx;
        float gy;
        int na;
        int t_last_zero_eng;
        int zero_eng_count;
        /* reset the data vectors */
        {
            register int i;
            for ( i = 0; i < npts; i++) {
                xdta[i] = 0.0;
                ydta[i] = 0.0;
            }
        }
        /* reset the filter state vars */
        xa = 0.0;
        ya = 0.0;
        gx = 0.0;
        gy = 0.0;
        na = 0;
        /* reset time */
        t = -npts;
        /* increase the error count */
        ecnt++;
        error_flag = 0;
        t_last_zero_eng = t;      /* time of last zero energy period */
        zero_eng_count = 0;       /* count of this zero energy period */ while(!quit_flag && ! error_flag) {
            int nread;

/* block on serial port input
             * Technically, this is not POSIX compatible,
             * but it gives valuable time back to the o/s
             */
            {
                fd_set readfds, exceptfds;
                int sfn;
                int ret;

sfn = sio_fileno(&f);
``` sgest.c sgest.c

...main

```
            FD_ZERO(&readfds);
            FD_ZERO(&exceptfds);

FD_SET(sfn,&readfds);
            FD_SET(sfn,&exceptfds);

ret = select(FD_SETSIZE, &readfds, NULL, &exceptfds, NULL);
            if (ret < 0) perror('select error");
        } nread = read_slow_data(&f, npts, xdta, ydta,
                                    SUBSAMPLE, &na, &xa, &ya, &gx, &gy,
                                    SCALE_X, SCALE_Y, OFFSET_X, OFFSET_Y );
        if (nread < 0) {
            perror("data reading error (probably reframing)");
            error_flag = 1;
        } else if (nread > 0) {
            register int i;
            t += nread;

/* we watch for pauses in this loop */
            for (i = 0; i < nread; i++) {
                register int tn=npts-nread+i;

/* count the length of zero eng */
                if (xdta[tn] < MAG_ZERO_TH) {

/* if it's been zero for minimum amount of time */
                    if (zero_eng_count++ > MAG_ZERO_T) {

/* if we're not still in same zero stored off already */
                        if (t_last_zero_eng+1 < t+tn) {
                            gest_store(ecnl,t,
                                        t_last_zero_eng-t,
                                        tn+1-zero_eng_count,
                                        xdta,ydta);
                        }
                        t_last_zero_eng = t+tn; /* store as end of last zero energy */
                    }

} else {                /* mag not zero */
                    zero_eng_count = 0;
                }
            }
        }
    } cleanup_quit_sighandler();

free((void *)xdta);
    free((void *)ydta);

} if (sio_close(&f) < 0) {
    perror("Unable to close serial port");
    return(1);
}

}
``` sgest.c

```
    gest_save();
    sif_cleanup();
    return(0);
}
``` sgest.c

*...main*

.

.

.

siface.c

```
/******************************************************************/
/*
 * This file contains the entry point to
 * The pattern matching routines.
 *
 * Darrin B. Jewell (jewell@bdi.com)   Wed Apr  5 18:38:09 1995
 *
 *
 */
/******************************************************************/
ifndef _POSIX_SOURCE
define _POSIX_SOURCE
endif include <stdio.h>
include <errno.h>
#include <string.h>
#include <stdlib.h>
#include <unistd.h>
#include <signal.h>
#include <time.h>
#include <assert.h>
include <math.h> include <kneighbor /kneighbor.h>

/******************************************************************/ define MATCHLEN (128) /* must match  2*NPTS in sgest.c */ static DATASET_BANK *db = NULL;

/* Initialization routine, gets handed an
 * argv/argc style list of bdi data files, one for each
 * gesture in the learn set
 */
void
sif_init(int fc, char *fv[])
{ fprintf(stderr,"Initializing K Nearest Neighbor classifier.\n");
   fprintf(stderr,"\t with (%d) gestures.\n",fc);
   {
     int i;
     for (i = 0; i < fc; i++) {
        fprintf(stderr,"\t\t%s\n",fv[i]);
     }
   } if (fc > 0) {
      db = read_datasets(fc,fv);
      assert(db);
   } fprintf(stderr,"\tDone reading files\n");
}

/******************************************************************/
```

*sif_init* siface.c

```c
/*
 * This gets called with an arry of floats.
 * to compare a new gesture with the previously
 * loaded learn set.
 * fc/fv should have the same values as when loaded above
 * in sif_init().
 */
void
sif_report(int fc, char *fv[],float *match)
{
  if (db) {
    int ncompare;
    int *sorted_list;
    int k;
    int class;

sorted_list = k_compare(match, MATCHLEN, db, &ncompare);

assert(sorted_list);

k = (int)sqrt(((double)ncompare)+0.5);
    class = k_best(sorted_list, k);

free(sorted_list);

assert(class < fc);

fprintf(stderr, "KNN majority shows: (%d) (%s)\n",
                class, fv[class]);
    fflush(stderr);

fprintf(stdout, "USER %s\n", fv[class]);
    fflush(stdout);
  }
}

/***************************************************************/

/*
 * This must be called when you are done.
 */
void
sif_cleanup(void)
{
  if (db) {
    free_dataset_bank(db);
  }
}
```

*sif_report*

*sif_cleanup* serio.h
serio.h

```
/*******************************************************/
/* Darrin B. Jewell (jewell@bdi.com)  Tue Sep 13 21:09:44 1994
 *
 * Functions to read WAND serial port data
 *
 *
 *
 */
/*******************************************************/ ifndef SERIO_H_INCLUDED
define SERIO_H_INCLUDED

/* for termios structure */
#include <termios.h>

/*******************************************************/
typedef struct siof_T_struct siof_T;
/* An sio file descriptor.
 * These need to be allocated by the user before
 * calling sio_open(), and freed after calling
 * sio_close().
 */ extern int sio_open(siof_T *f, const char *path);
/* Takes pointer to an sio file descriptor F, which the
 * caller must have already allocated.  It opens PATH
 * as a serial port input for reading records
 * from a wand gesture external device.  This will
 * set the correct parameters for serial port communication.
 * returns: 0 on success, -1 and sets errno on failure.
 */ extern int sio_close(siof_T *f);
/* Takes pointer to a previously opened sio file descriptor F
 * and restores its original communication paramters that
 * were saved from a previous sio_open() call.
 * returns: 0 on success, -1 and sets errno on failure.
 */ typedef struct sio_rec_T_struct {
    unsigned char val1;      /* first value read */
    unsigned char val2;      /* second value read */
    unsigned char val3;      /* third value read */
} sio_rec_T;
/* a data structure used to get records with sio_read()
 */ extern int sio_read(siof_T *f, sio_rec_T *recs, int n);
define SIO_MAXREAD (512)         /* maximum number of records requestable */
/* Takes pointer to a previously opened sio file descriptor F
 * and pointer to an array of RECS structures of length N
 * that will receive data.  At most SIO_MAXREAD records
 * will be returned.  If an error is returned, the next
 * read will attempt to re-frame the reading of records, and
 * data may have been lost.  This call will not block, but
 * may return 0 if no full record is ready but no error has occured.
 * returns: number of records read or -1 and sets errno on failure.
 */ extern int sio_fileno(siof_T *f);
/* Takes pointer to a previously opened sio file descriptor F
 * and returns the number of the unix file descriptor that
 * is actually being read from.  This is suitable, for example,
 * for a select() call to determine if new data has arrived.
``` serio.h

```c
 * returns: fileno on success, -1 and sets errno on failure.
 */

/* The rate at which the data is expected to arrive from the wand.
 * This is simply the E clock divided by the real time
 * interrupt rate devisor as configured on board the 6811
 */
#define SAMPLE_HZ (2.0e6 / ((float)(1<<13)))   /* 244.140625 Hz */

/****************************************************************/
/* below here is private information, that should
 * not be mucked with except in serio.c
 */ define SIO_RECORD_LEN (4)         /* length of record as sent accross serial line */
define FRAMENO_MASK   (0x0f)      /* valid bits of the frameno counter */ struct siof_T_struct {
    int fd;                                /* unix file descriptor */
    struct termios old_termios;            /* save serial line params for restore */
    struct termios new_termios;            /* current serial line params while open */
    int reframe;                           /* reframe records on next read */
    unsigned char frameno;                 /* sequential frame counter */
    unsigned char part[SIO_RECORD_LEN-1];  /* partial record */
    int npart;                             /* number of valid values in part */
};

#define sio_fileno(f)  ((f)->fd)   /* see above */

/****************************************************************/
#endif /* SERIO_H_INCLUDED */
/****************************************************************/
``` serio.c

```
/*********************************************************/
/* Darrin B. Jewell (jewell@bdi.com)  Tue Sep 13 21:09:44 1994
 *
 * Functions to read WAND serial port data
 *
 *
 */
/*********************************************************/ ifndef _POSIX_SOURCE
define _POSIX_SOURCE
endif

/* for fprintf() */
#include <stdio.h>

/* for open() */
#include <sys/types.h>
#include <sys/stat.h>
#include <fcntl.h>

/* for error reporting */
#include <errno.h>

/* for close(), read() */
#include <unistd.h>

/* for termios structure,
 * tcsetattr(), tcgetattr(), cfsetispeed(), cfsetospeed().
 */
#include <termios.h>

/* for assert() */
include <assert.h> include "serio.h"
/*********************************************************/ define BFALSE ((unsigned long)0)
define BTRUE  (~BFALSE)

#define BSET(_bits_,_mask_,_val_) \
    ((_bits_) = ((((_bits_) & ~(_mask_)) | ((_val_) & (_mask_)))))

#define SENS_EPS (0.1)  /* m/s^2 */
/*********************************************************/

/* it is a macro in the header */
undef sio_fileno int
sio_fileno(siof_T *f)
{
   return(f->fd);
} int
sio_open(siof_T *f, const char *path)
{
   if (!f) {
```

*sio_fileno*

*sio_open* serio.c serio.c

...sio_open

```
        errno = EFAULT;  /* Bad address */
        return(-1);
    }

{
        siof_T siof;  /* hold file until everything a-ok */ siof.fd = open(path, (O_RDWR | O_NOCTTY));

if (siof.fd < 0) {
            /* errno is already set */
            return(-1);
        } if (tcgetattr(siof.fd, &(siof.old_termios)) < 0) {
            int esave = errno;
            close(siof.fd);
            errno = esave;
            return(-1);
        }

/* Make a copy of the termios to modify */
        siof.new_termios = siof.old_termios;

BSET(siof.new_termios.c_iflag, BRKINT, BFALSE); /* interrupt on break */
        BSET(siof.new_termios.c_iflag, ICRNL,  BFALSE); /* \r -> \n xlation */
        BSET(siof.new_termios.c_iflag, IGNBRK, BTRUE);  /* ignore break condition */
        BSET(siof.new_termios.c_iflag, IGNCR,  BFALSE); /* ignore \r */
        BSET(siof.new_termios.c_iflag, IGNPAR, BTRUE);  /* ignore parity errs */
        BSET(siof.new_termios.c_iflag, INLCR,  BFALSE); /* \n -> \r xlation */
        BSET(siof.new_termios.c_iflag, INPCK,  BFALSE); /* enable parity check */
        BSET(siof.new_termios.c_iflag, ISTRIP, BFALSE); /* strip to seven bits */
        BSET(siof.new_termios.c_iflag, IXOFF,  BFALSE); /* enable start/stop input */
        BSET(siof.new_termios.c_iflag, IXON,   BFALSE); /* enable start/stop output */
        BSET(siof.new_termios.c_iflag, PARMRK, BFALSE); /* mark parity errors */

BSET(siof.new_termios.c_oflag, OPOST,  BFALSE); /* perform output processing */

BSET(siof.new_termios.c_cflag, CLOCAL, BTRUE);  /* ignore modem status lines */
        BSET(siof.new_termios.c_cflag, CREAD,  BTRUE);  /* enable receiver */
        BSET(siof.new_termios.c_cflag, CSIZE,  CS8);    /* Number of bits 1 byte */
        BSET(siof.new_termios.c_cflag, CSTOPB, BTRUE);  /* Send two stop bits, else one */
        BSET(siof.new_termios.c_cflag, HUPCL,  BTRUE);  /* Hang up on last close */
        BSET(siof.new_termios.c_cflag, PARENB, BFALSE); /* Parity enable */
        BSET(siof.new_termios.c_cflag, PARODD, BFALSE); /* odd parity, else even */

BSET(siof.new_termios.c_lflag, ECHO,   BFALSE); /* Enable echo */
        BSET(siof.new_termios.c_lflag, ECHOE,  BFALSE); /* Echo erase as backspace */
        BSET(siof.new_termios.c_lflag, ECHOK,  BFALSE); /* Echo kill */
        BSET(siof.new_termios.c_lflag, ECHONL, BFALSE); /* echo \n */
        BSET(siof.new_termios.c_lflag, ICANON, BFALSE); /* Cannonical input */
        BSET(siof.new_termios.c_lflag, IEXTEN, BFALSE); /* enable extended functions */
        BSET(siof.new_termios.c_lflag, ISIG,   BFALSE); /* Enable signals */
        BSET(siof.new_termios.c_lflag, NOFLSH, BFALSE); /* Disable flush after int, quit, susp */
        BSET(siof.new_termios.c_lflag, TOSTOP, BFALSE); /* Send SIGTTOU for background output */

/* this is important to have ICANON set to FALSE above */
        /* siof.new_termios.c_cc[VINTR]  = */
        siof.new_termios.c_cc[VMIN]   = 0;  /* minimum number of chars to read() */
        /* siof.new_termios.c_cc[VQUIT] = */
        /* siof.new_termios.c_cc[VSUSP] = */
```

Apr 6 12:04 1995 serio.c  *...sio_open*

```
        siof.new_termios.c_cc[VTIME]  = 0;   /* tenths of seconds between read() chars */
        /* siof.new_termios.c_cc[VSTART] = */
        /* siof.new_termios.c_cc[VSTOP]  = */

/* Set output baud rate */
        if (cfsetospeed(&(siof.new_termios), B9600) < 0) {
            int esave = errno;
            close(siof.fd);
            errno = esave;
            return(-1);
        }

/* Set input baud rate */
        if (cfsetispeed(&(siof.new_termios), B9600) < 0) {
            int esave = errno;
            close(siof.fd);
            errno = esave;
            return(-1);
        } if (tcsetattr(siof.fd, TCSAFLUSH, &(siof.new_termios)) < 0) {
            int esave = errno;
            close(siof.fd);
            errno = esave;
            return(-1);
        }

/* technically, we might want to to a tcgetattr() and
         * compare to make sure that the changes stuck, since
         * tcsetattr() can still return w/o error if anything worked.
         * but we're lazy.
         */
        siof.reframe = 1;
        siof.npart = 0;

*f = siof;
    }
    return(0);
} int
sio_close(siof_T *f)                                                    sio_close
{
    if (!f) {
        errno = EFAULT;   /* Bad address */
        return(-1);
    }

/* this should be cleaned up and fixed for error checking */ tcsetattr(f->fd, TCSAFLUSH, &(f->old_termios));

close(f->fd);

f->fd = -1;

return(0);
}

/* Makes an attempt to reframe data.
 * returns 0 if successful (also clears fd->reframe)
 * if successful old partial data is flushed, but may leave new.
 * flushes data until it sees a frame bit.
 * returns -1 if error, or 1 if unable to find frame in
``` serio.c

```
 * SIO_RECORD_LENGTH chars.
 */
static int
sio_reframe(siof_T *f)
{
   if (!f) {
      errno = EFAULT;  /* Bad address */
      return(-1);
   }
   {
      int i;
      for (i = 0; i < SIO_RECORD_LEN; i++) {
         unsigned char c;
         int nread;
         nread = read(f->fd, &c, 1);
         if (nread == 0) errno = EAGAIN;
         if (nread <= 0) {
            /* errno is already set */
            f->reframe = 1;
            return(-1);
         } else if (c & 0x80) {
            f->part[0] = c;
            f->npart = 1;
            f->frameno = (c & FRAMENO_MASK);
            f->reframe = 0;
            return(0);
         }
      }
   }
   return(1);
}

/*
 * reads and returns an integral number of records
 * correctly deals with saving scrap.
 */
static int
sio_iread(siof_T *f, int nrecs, unsigned char *recs)
{
   /* check args */
   if (!f) {
      errno = EFAULT;
      return(-1);
   } if (nrecs < 0) {
      f->npart = 0;
      errno = EINVAL;
      return(-1);
   } if (nrecs == 0) return(0);    /* handle a zero request cleanly */ if (!recs) {
      f->npart = 0;
      errno = EFAULT;
      return(-1);
   }
``` serio.c

*sio_reframe*

*sio_iread* serio.c serio.c

...sio_iread

```
/* npart should never be >= SIO_RECORD_LEN
 * if it is, then we might ask for a negative
 * number of chars from read() or just never
 * ask for chars because we have a full record
 * in the partial record buf.
 * these asserts verify this.
 */
assert(nrecs > 0);
assert(f->npart < SIO_RECORD_LEN);

{
    int nread;

/* get new data, leaving space for already
     * read partial record
     */
    nread = read(f->fd,
                 &(recs[f->npart]),
                 ((SIO_RECORD_LEN * nrecs) - f->npart));

/* check for errors, if so.. flush partial records */
    if (nread < 0) {
        f->npart = 0;
        return(-1);
    }

/* check to make sure there is new data ready */
    if (nread == 0) {
        return(0);
    }

/* now fill in from partial records */
    {
        register int i;
        for (i = 0; i < f->npart; i++) {
            recs[i] = f->part[i];
        }
    }
    nread += f->npart;

/* now save off extra records read */
    {
        register int i, n;
        register unsigned char *p;

{
            register int itmp;
            itmp = ((nread / SIO_RECORD_LEN) * SIO_RECORD_LEN);
            p = &(recs[itmp]);
            n = nread - itmp;
        } for (i = 0; i < n; i++) {
            f->part[i] = *p++;
        }
        f->npart = n;
    } return(nread / SIO_RECORD_LEN);
}
} int
sio_read(siof_T *f,
```

Apr 6 12:04 1995 serio.c

```
            sio_rec_T *recs,
            int n)
{
    errno = 0;

if (!f) {
        errno = EFAULT;   /* Bad address */
        return(-1);
    }

/* reframe if necessary. */
    if (f->reframe) {
        int r;
        r = sio_reframe(f);
        if (r < 0) return(-1);        /* read error */
        if (r > 0) {                   /* didn't find a frame marker */
            f->reframe = 1;            /* keep looking */
            errno = EIO;
            return(-1);
        }
    }

/* shorten request if necessary */
    if (n > SIO_MAXREAD) n = SIO_MAXREAD;

{
        int nread;
        unsigned char rbuf[SIO_MAXREAD * SIO_RECORD_LEN];

nread = sio_iread(f, n, rbuf);
        if (nread < 0) {
            f->reframe = 1;
            return(-1);
        }

/* check framing */
        {
            register int i;
            for ( i = 0; i < nread; i++) {
                if (! ((rbuf[SIO_RECORD_LEN*i] & 0x80) &&
                       ((rbuf[SIO_RECORD_LEN*i] & FRAMENO_MASK) == (f->frameno++ & FRAMENO_MASK)))) {
                    f->reframe = 1;
                    errno = EIO;
                    return(-1);
                }
                {
                    register int j;
                    for(j=1;j<SIO_RECORD_LEN;j++) {
                        if ((rbuf[(SIO_RECORD_LEN*i)+j]) & 0x80) {
                            errno = EIO;
                            f->reframe = 1;
                            return(-1);
                        }
                    }
                }
            }
        }

/* by now, we should be all framed up! */
        assert(! f->reframe);

#define EXTRACT_VAL(rbuf,i,n) \
        ((((rbuf)[SIO_RECORD_LEN*(i)] & (0x80 >> (n))) << (n)) | \
         (rbuf)[SIO_RECORD_LEN*(i)+(n)])
```

Apr 6 12:04 1995 serio.c serio.c

```
{
    register int i;
    for (i = 0; i < nread; i++) {
        recs[i].val1 = EXTRACT_VAL(rbuf,i,1);
        recs[i].val2 = EXTRACT_VAL(rbuf,i,2);
        recs[i].val3 = EXTRACT_VAL(rbuf,i,3);
    }
} return(nread);
}
}
```

•

•

• ldata.h

```
/*********************************************************/
/*
 * The interface into the data file used is in this file.
 *
 * This is currently the BDI standard data file format.
 *
 * Darrin B. Jewell (jewell@bdi.com)   Fri Nov 18 02:48:31 1994
 *
 *
 *
 */
/*********************************************************/ ifndef LDATA_H_INCLUDED
define LDATA_H_INCLUDED include <legdata.h> typedef ll_data  lda_T;

typedef ll_var   ldv_T;

extern lda_T *lda_init(int npts, float dt);
extern lda_T *lda_load(char *filename);
extern int   lda_save(lda_T *ldata, char *filename);
extern int   lda_cleanup(lda_T *ldata);

extern int lda_store(lda_T *ldata, char *dta_name, char *units,
                     float lo, float hi, float *dta);

extern int lda_get_npoints(lda_T *ldata, int *npts);
extern int lda_get_dt(lda_T *ldata, float *dt);
extern int lda_get_var(lda_T *ldata, char *dta_name, char *units,
                       float *lo, float *hi, float *dta);
extern int lda_walk_varnames(lda_T *ldata, void *misc,
                             void (*func)(lda_T *ldata, void *misc, char *varname));

#endif /* LDATA_H_INCLUDED */
/*********************************************************/
``` ldata.c

```
/******************************************************************/
/*
 * The interface into the data file used is in this file.
 *
 * This is currently the BDI standard data file format.
 *
 * Darrin B. Jewell (jewell@bdi.com)   Fri Nov 18 02:48:31 1994
 *
 *
 */
/******************************************************************/ ifndef _POSIX_SOURCE
define _POSIX_SOURCE
endif include <stdio.h>
include <errno.h>

/* for malloc() and free() */
#include <stdlib.h>

/* for time stuff */
include <time.h> include <string.h> include <legdata.h> include "ldata.h"

/******************************************************************/ lda_T *
lda_init(int npts, float dt)                                            lda_init
{
   lda_T *ldata;

ldata = Init_data_file();
   ldata->dt = dt;
   ldata->out = ldata->npoints = ldata->hpoints = npts;
   ldata->in = 0;

return(ldata);
} lda_T *
lda_load(char *filename)                                                lda_load
{
   FILE *f;

f = fopen(filename,"r");
   if (! f) {
      return(NULL);
   } return(Read_data_file(f));
} int
lda_save(lda_T *ldata, char *filename)                                  lda_save
{
   FILE *f;
``` ldata.c ldata.c

*...lda_save*

```
    f = fopen(filename,"w");
    if (! f) {
        return(-1);
    }

/* set the time field of the file */
    {
        char *when;
        char *now;
        int len;
        {
            time_t t;
            time(&t);
            now = ctime(&t);
        }
        len = strlen(now);
        when = (char *)malloc((len+1) * sizeof(char));
        if (when) {
            strcpy(when, now);
            when[len-1] = '\0';  /* chop newline */
            free((void *)ldata->when);
            ldata->when = when;
        }
    }

/* set the title field to the filename */
    {
        char *title;
        title = (char *)malloc((strlen(filename)+1) * sizeof(char));
        if (title) {
            free((void *)ldata->title);
            strcpy(title, filename);
            ldata->title = title;
        }
    }

Write_data_file(ldata,f);

return(fclose(f));
} int
lda_store(lda_T *ldata, char *dta_name, char *units,
              float lo, float hi, float *dta)
{
    float *fdata;

fdata = (float *)malloc(ldata->npoints * sizeof(float));

if (! fdata) return(-1);

{
        float min = dta[0];
        float max = dta[0];
        {
            register int i;
            for (i = 0; i < ldata->npoints; i++ ) {
                if (dta[i] < min) min = dta[i];
                if (dta[i] > max) max = dta[i];
                fdata[i] = dta[i];
            }
        }

Add_var(ldata, dta_name, units, lo, hi, min, max, fdata);
``` ldata.c                                                                ldata.c

```
   }
   return(0);
} int
lda_cleanup(lda_T *ldata)                                    lda_cleanup
{
   /* note that this call will free the above alloced data vectors */
   Free_data(ldata);
   return(0);
} int
lda_get_npoints(lda_T *ldata, int *npts)                     lda_get_npoints
{
   if (!ldata) return(-1);
   if (!npts) return(-1);

*npts = ldata->npoints;

return(0);
} int
lda_get_dt(lda_T *ldata, float *dt)                          lda_get_dt
{
   if (!ldata) return(-1);
   if (!dt) return(-1);

*dt = ldata->dt;

return(0);
} int
lda_get_var(lda_T *ldata, char *dta_name, char *units,
            float *lo, float *hi, float *dta)
{
   ll_var *v;

v = Find_var(ldata, dta_name);
   if (!v) return(-1);

if (dta) {
      register int i;
      for (i = 0; i < ldata->npoints; i++) {
         dta[i] = v->fdata[i];
      }
   } if (lo) *lo = v->low;
   if (hi) *hi = v->high;
   if (units) {
      strncpy(units, v->units, UNITS_LENGTH);
      units[UNITS_LENGTH-1] = '\0';
   }
   return(0);
} int
lda_walk_varnames(lda_T *ldata, void *misc,                  void
                  void (*func)(lda_T *ldata, void *misc, char *varname))
{
   if (!ldata) return (-1);
```

Apr 6 12:03 1995                                             Page 3 of ldata.c ldata.c

```
{
    register int i;
    for (i = 0; i < ldata->nvars; i++) {
        (*func)(ldata, misc, ldata->vnames[i]);
    }
}
return(0);
}
/*************************************************************/
``` ldata.c

*...void*

•

•

• kneighbor.h

```
/*
/*
/*****************************************************************
 *  K-Neighbor
 *  Structural definitions and functional declarations for implementing   *
 *  k-nearest-neighbor algorithm
 *
 *  04-03-95  WCB created.
 *****************************************************************/ define MAX_DATASET_FILELENGTH 128 typedef struct {
    int num_points;
    float *point;
} SAMPLE;

typedef struct {
    char filename[MAX_DATASET_FILELENGTH];
    int num_samples;
    SAMPLE *sample;
} DATASET;

typedef struct {
    int num_ds;
    DATASET *ds;
} DATASET_BANK;

/* function declarations */
int k_best();
int *k_compare();
DATASET_BANK *read_datasets();
void free_dataset_bank();
/*****************************************************************
``` kneighbor.c																kneighbor.c

```
/*                                                                      */
/*                                                                      */
/************************************************************************
 * K-Neighbor
 * Functions that comprise the k-nearest-neighbor algorithm.
 *
 * read_datasets() - read BDI data files and create a databank of
 *                   datasets.  NOTE: IT IS THE USER'S RESPONSIBILITY TO
 *                   FREE THE RETURNED DATABANK BY CALLING
 *                   FREE_DATASET_BANK
 * free_dataset_bank() - free memory allocated for your databank
 * k_compare() - compare an input gesture with the gestures in the
 *                   the databank.  Return an integer array of the
 *                   datasets that were closest to the input gesture.
 *                   NOTE: IT IS THE USER'S RESPONSIBILITY TO FREE THE RE-
 *                   TURNED INTEGER ARRAY.  Just use free(ia).
 * k_best() - given an integer array and a K value, return the value in
 *                   the array that was most frequently indicated in the first
 *                   K values of the array.
 *
 *
 * 04-03-95  WCB created.
 ************************************************************************/ include "kneighbor.h"
include "legdata.h"
#include <stdio.h>
#include <malloc.h>
include <string.h> void free_dataset_bank(DATASET_BANK *db)
{
/* Free an input dataset bank
    Input - db - a pointer to the dataset bank to be freed.
    Output - none
************************************************************/
int i, j;
for (i = 0; i < db->num_ds; i++)
    {
    free(db->ds[i].sample);
    }
free(db->ds);
free(db);
}

DATASET_BANK *read_datasets(int argc, char *argv[])
{
/* create a dataset bank from a list of BDI data files.  Some
    data verification is performed at the end to ensure that
    the data is all of the same format.
    Input - argc - number of data filenames listed in argv.
            argv - array of strings, each indicating the filename
                   of a BDI data file.
    Output - DATASET_BANK * - a pointer to the created databank.
    NOTE: THE USER IS RESPONSIBLE FOR FREEING THE RETURNED DATABANK.
            THE USER SHOULD USE free_dataset_bank().
************************************************************/
int i,j,k;
FILE *fp;
DATASET_BANK *db;
``` kneighbor.c

```c
/* Perform bank and dataset allocations */
if ((db = (DATASET_BANK *)malloc(sizeof(DATASET_BANK))) == (DATASET_BANK *)0)
    {fprintf(stderr,"Unable to allocate DATASET_BANK\n"); exit(1);}
if ((db->ds = (DATASET *)malloc(sizeof(DATASET)*argc)) == (DATASET *)0)
    {fprintf(stderr,"Unable to allocate DATASETS\n"); exit(1);} db->num_ds = argc;

/* Load each Dataset */
for (i = 0; i < argc; i++)
{
    ll_data *ldata;

/* Open the dataset file */
    if (strlen(argv[i]) + 1 > MAX_DATASET_FILELENGTH)
        {fprintf(stderr,"MAX_DATASET_FILELENGTH of %d exceeded.\nFILENAME: %s LENGHT %d\n",
            MAX_DATASET_FILELENGTH, argv[i], strlen(argv[i])); exit(1);}
    strcpy(db->ds[i].filename, argv[i]);
    if ((fp = fopen(db->ds[i].filename, "r")) == (FILE *)0)
        {fprintf(stderr,"Unable to open file %s\n", db->ds[i].filename); exit(1);}

/* Read the dataset */
    ldata = Read_data_file(fp);
    if (!ldata)
        {fprintf(stderr,"Unable to read BDI data file %s\n", db->ds[i].filename);
        exit(1);} fclose(fp);

/* Translate the dataset */
    db->ds[i].num_samples = ldata->nvars;
    if ((db->ds[i].sample = (SAMPLE *)malloc(sizeof(SAMPLE) * ldata->nvars)) ==
        (SAMPLE *)0)
        {fprintf(stderr,"Unable to allocate %d SAMPLES for DATASET %s\n",
            ldata->nvars, db->ds[i].filename); exit(1);}
    for (j = 0; j < db->ds[i].num_samples; j++)
    {
        db->ds[i].sample[j].num_points = ldata->npoints;
        if ((db->ds[i].sample[j].point = (float *)malloc(sizeof(float) * ldata->npoints)) ==
            (float *)0)
            {fprintf(stderr,"Unable to allocate %d floats for DATASET %s sample %d\n",
                ldata->npoints, db->ds[i].filename, j+1); exit(1);}
        for (k = 0; k < ldata->npoints; k++)
            db->ds[i].sample[j].point[k] = ldata->fdata[j][k];
    }
    Free_data(ldata);
}

/* Check databank sample size consistency */
for (i = 1; i < db->num_ds; i++)
    if (db->ds[0].num_samples != db->ds[i].num_samples)
        {fprintf(stderr,"ERROR - All datasets should have the same number of samples.\n Dataset %s has %d samples but\nDatase
            db->ds[0].filename, db->ds[0].num_samples, db->ds[i].filename,
            db->ds[i].num_samples); exit(1); }

/* Check databank data point consistency */
for (i = 0; i < db->num_ds; i++)
    for (j = 0; j < db->ds[i].num_samples; j++)
        if (db->ds[0].sample[0].num_points != db->ds[i].sample[j].num_points)
            {fprintf(stderr,"ERROR - All dataset samples should have the same number of data points .\n Dataset %s Sample %d
                db->ds[0].filename, 0, db->ds[0].sample[0].num_points,
                db->ds[i].filename, j, db->ds[0].sample[0].num_points); exit(1);} return(db);
``` kneighbor.c kneighbor.c

```
} int *k_compare(float val[], int n, DATASET_BANK *db, int *length)
{
/* compare an input array to the various samples in the dataset_bank
    and return an integer array indicating in order which datasets
    were closest.  Note that each dataset will appear in the returned
    integer array an equal number of times to the number of samples
    provided for that dataset.
    Input - val - array of floats user would like to compare to the
                    samples in the dataset bank.
            n - length of the val array.
            db - pointer to the dataset bank.
    Output - int * - integer array of best datasets.
            length - length of the integer array returned.
    NOTE: THE USER IS RESPONSIBLE FOR FREEING THE RETURNED INTEGER ARRAY.
          THE USER SHOULD USE free(ia).
************************************************************** /
int end;
int i,j,k,s;
int *ia;
float *sfa, fval;

*length = db->num_ds * db->ds[0].num_samples;
/* check n */
if (n != db->ds[0].sample[0].num_points)
    {fprintf(stderr, "Sample #%d of dataset %s\nhas %d data points but is being compared to %d data points.\n",
     s, db->ds[i].filename, n); exit(1);}

/* allocate the sorted integer array and float array */
if ((ia = (int *)malloc(sizeof(int) * (*length))) ==
        (int *)0)
    {fprintf(stderr,"Unable to allocate %d ints in compare\n",
                    (*length)); exit(1);}
if ((sfa = (float *)malloc(sizeof(float) * (*length))) ==
        (float *)0)
    {fprintf(stderr,"Unable to allocate %d floats in compare\n",
                    (*length)); exit(1);}

/* Perform the comparisons */
for (i = 0, end = 0; i < db->num_ds; i++)
   for (s = 0; s < db->ds[i].num_samples; s++)
      {
      for (j = 1, fval = (val[0] - db->ds[i].sample[s].point[0]) *
                         (val[0] - db->ds[i].sample[s].point[0]);
           j < n; fval +=(val[j] - db->ds[i].sample[s].point[j]) *
                         (val[j] - db->ds[i].sample[s].point[j]), j++);
      for (j = 0; j < end && sfa[j] < fval; j++);
      for (k = end; k > j; sfa[k] = sfa[k-1], ia[k] = ia[k-1], k--);
      sfa[j] = fval; ia[j] = i; end++;
      }
free(sfa);
return(ia);
} int k_best(int *ia, int k)
{
/* return the most frequent entry in the first k values of an
    input integer array.
    Input - ia - integer array to be checked.
            k - number of values to test.
    Output - int - Value most frequently found in the first k values of ia.
************************************************************** /
``` kneighbor.c

```c
int i,j;
int topscore, topval, curscore;

topscore = 0;
for (i = 0; i < k; i++)
    {
    for (j = 0; j < i && ia[j] != ia[i]; j++);
    if (j == i)
        {
        for (j = i+1, curscore = 1; j < k;
                        curscore += (ia[j] == ia[i])? 1:0, j++);
        if (curscore > topscore)
            {topscore = curscore; topval = ia[i];}
        }
    }
return(topval);
}
``` kneighbor.c

Having above indicated a preferred embodiment of the present invention, it will occur to those skilled in the art that modifications and alternatives can be practiced within the spirit of the invention. It is accordingly intended to define the scope of the invention only as indicated in the following claims.

We claim:

1. Apparatus for the control of on-screen animated characters presented by a computer driven display to control the movement of said on-screen characters, comprising:

a computer having a display coupled thereto;

an egg shaped hand-held computer control device having at least one accelerometer therein;

means for transmitting the output of said accelerometer to said computer; and, means for transmitting the output of said accelerometer to said computer; and, means receiving said transmitted output for controlling the motion of said character in accordance with a characteristic of said accelerometer output said means for controlling the motion of said character including means for providing a template corresponding to a predetermined characteristic of said output, means for matching said output to said template and means for controlling said on-screen character in a predetermined fashion upon a match of said output to said template, said predetermined fashion including patterns of movement reflecting emotive content.

2. The apparatus of claim 1, wherein said characteristic of said output includes characteristics relating to a predetermined pattern of behavior reflecting style.

3. The apparatus of claim 1 and further including means for referencing said output to the local gravitational field at said device.

4. The apparatus of claim 3 wherein said referencing means includes high pass filtering means for filtering out gravitational components such that said device functions in an orientation-independent manner.

5. The apparatus of claim 1 wherein said device is untethered to said computer.

6. The apparatus of claim 1 and further including an additional accelerometer oriented orthogonal to said accelerometer.

7. The apparatus of claim 1 wherein said output is directly coupled to said means for controlling the motion of said character and wherein said means for controlling the motion of said character includes means for specifying a generalized motion for said character, said direct coupled output controlling the style of the specified generalized motion of said character.

8. The apparatus of claim 1 and further including a plurality of said templates, each of said templates corresponding to a different motion of both said device and said character.

9. The apparatus of claim 8 wherein said means for controlling the motion of said character includes means responsive to match with more than one template for controlling said on-screen character.

10. The apparatus of claim 9 wherein said means for controlling the motion of said on-screen character includes means for detecting successive matches of said output with different ones of said templates and for controlling said motion responsive to the completion of successive matches.

11. The apparatus of claim 1 wherein said means for controlling the motion of said character includes means for determining direction of the acceleration of said device and means for moving said on-screen character in the direction of said determined direction of said acceleration.

* * * * *